(12) United States Patent
Doi

(10) Patent No.: US 11,902,617 B2
(45) Date of Patent: Feb. 13, 2024

(54) SOURCE DEVICE AND SINK DEVICE

(71) Applicant: KABUSHIKI KAISHA TOSHIBA, Tokyo (JP)

(72) Inventor: Takashi Doi, Fuchu (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 0 days.

(21) Appl. No.: 17/930,171

(22) Filed: Sep. 7, 2022

(65) Prior Publication Data

US 2023/0291961 A1    Sep. 14, 2023

(30) Foreign Application Priority Data

Mar. 14, 2022   (JP) .................................. 2022-039404

(51) Int. Cl.
   *H04N 21/438*  (2011.01)
(52) U.S. Cl.
   CPC ................................ *H04N 21/438* (2013.01)

(58) Field of Classification Search
None
See application file for complete search history.

(56) References Cited

U.S. PATENT DOCUMENTS

| | | | |
|---|---|---|---|
| 2013/0181884 A1* | 7/2013 | Perkins | ................. G09F 9/3026 345/1.3 |
| 2020/0348898 A1* | 11/2020 | Son | ..................... H04N 21/426 |
| 2021/0400246 A1 | 12/2021 | Ota | |

FOREIGN PATENT DOCUMENTS

| | | | | | |
|---|---|---|---|---|---|
| JP | 2001013937 A | * | 1/2001 | .......... | G06F 3/1431 |
| JP | 2022-3749 A | | 1/2022 | | |
| WO | WO-2021081512 A1 | * | 4/2021 | .......... | G06F 3/1446 |

* cited by examiner

*Primary Examiner* — Omar S Parra
(74) *Attorney, Agent, or Firm* — Oblon, McClelland, Maier & Neustadt, L.L.P.

(57) ABSTRACT

According to one embodiment, a source device generates a multistream signal transmitted to a plurality of sink devices which are connected by daisy-chaining and generates the multistream signal by associating daisy chain stage numbers of the sink devices with contents streams for the sink devices.

4 Claims, 22 Drawing Sheets

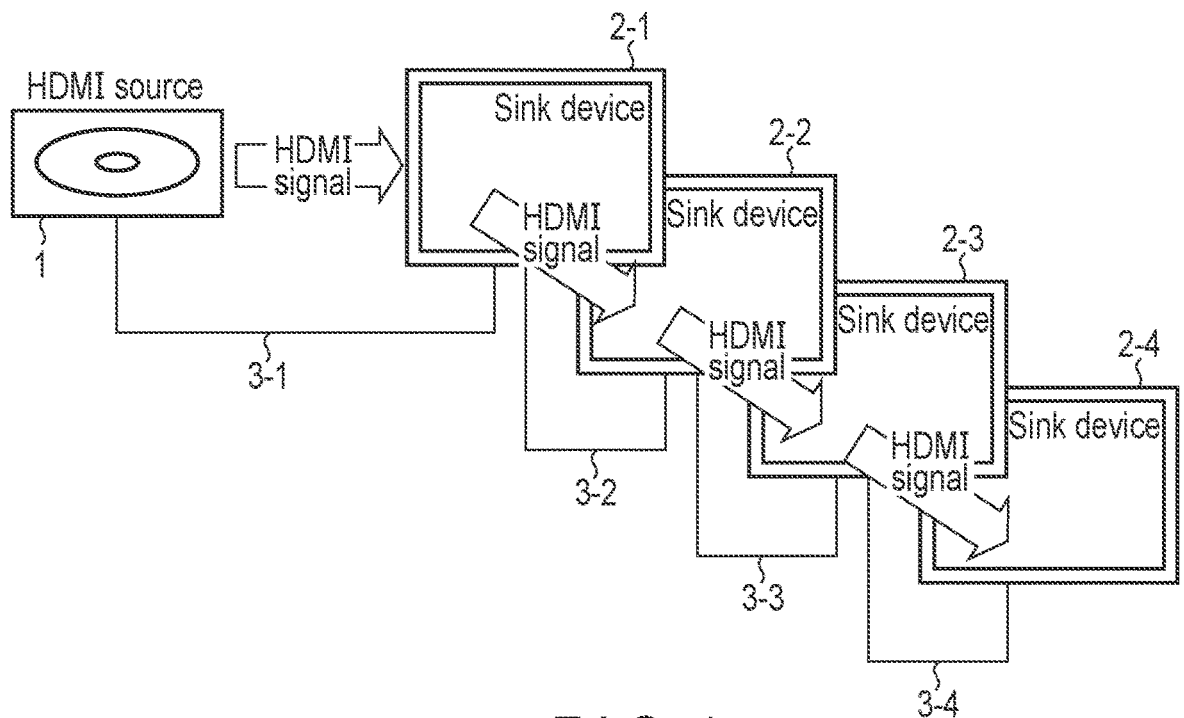
F I G. 1
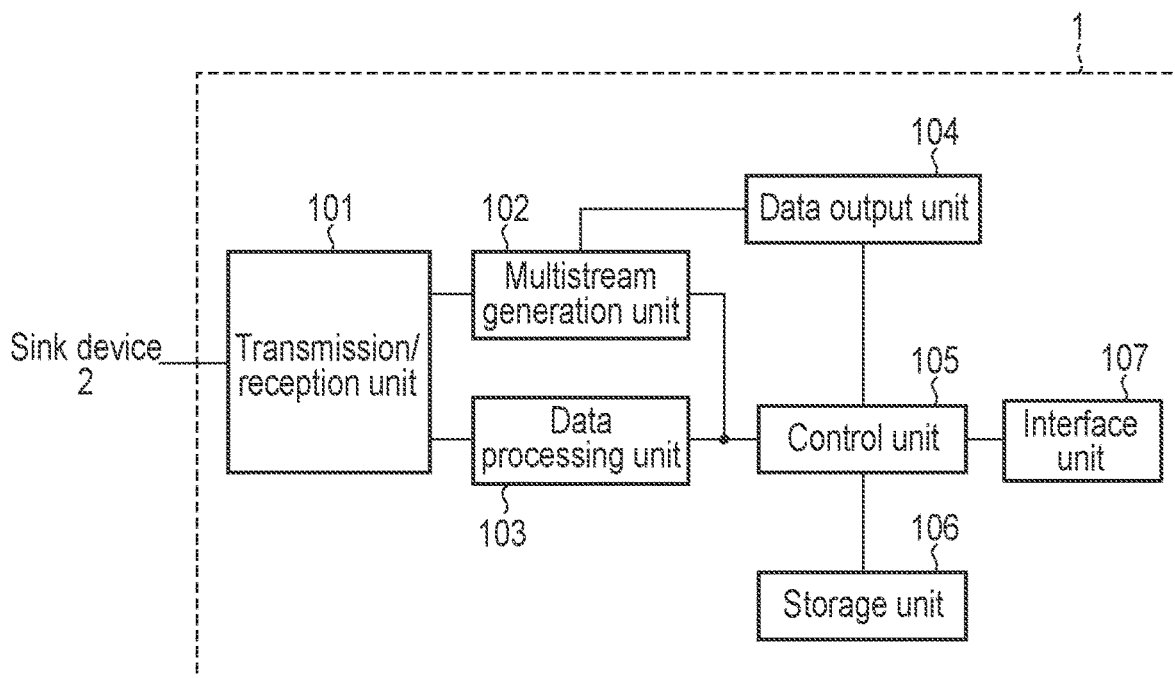
F I G. 2

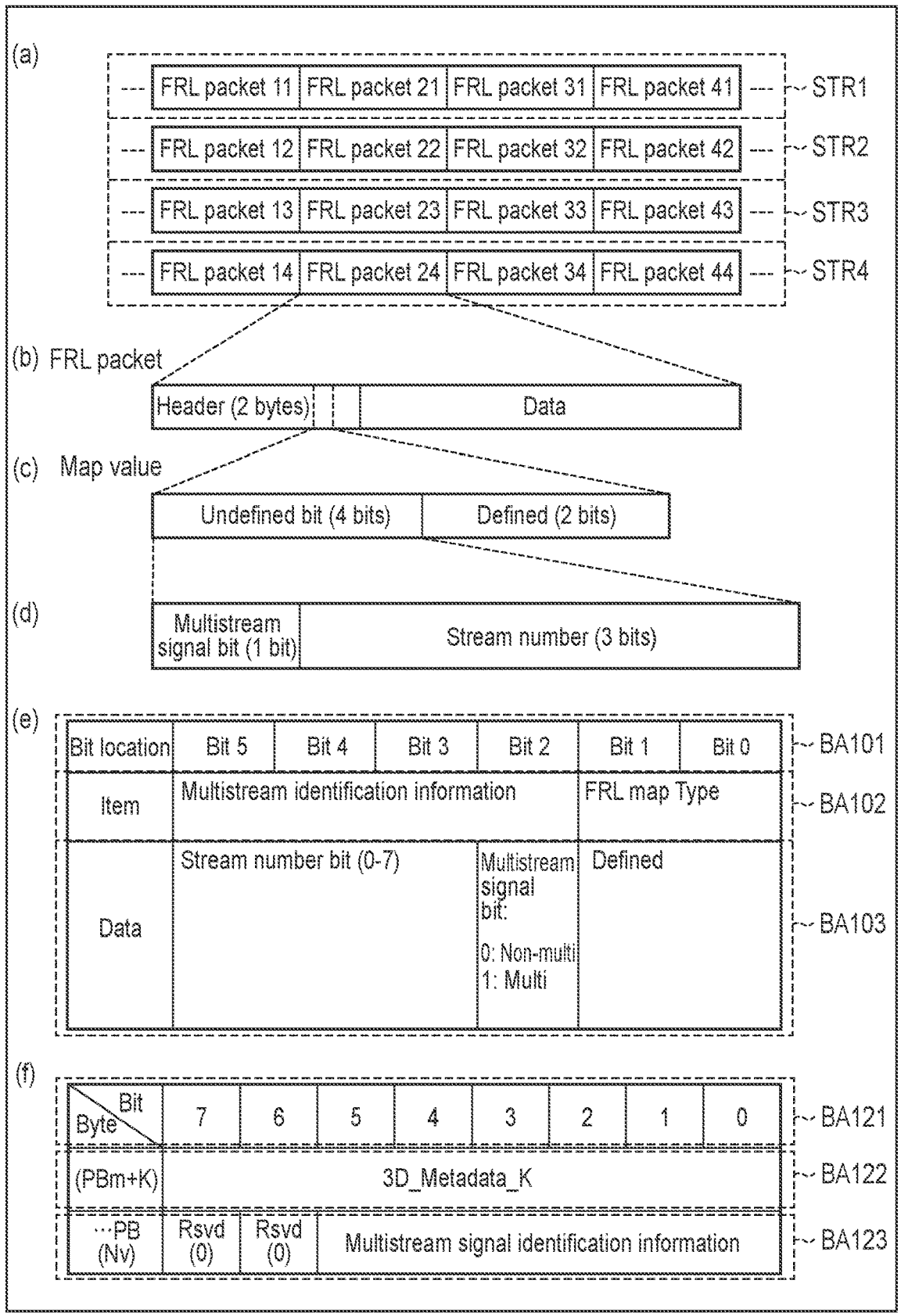
F I G. 4

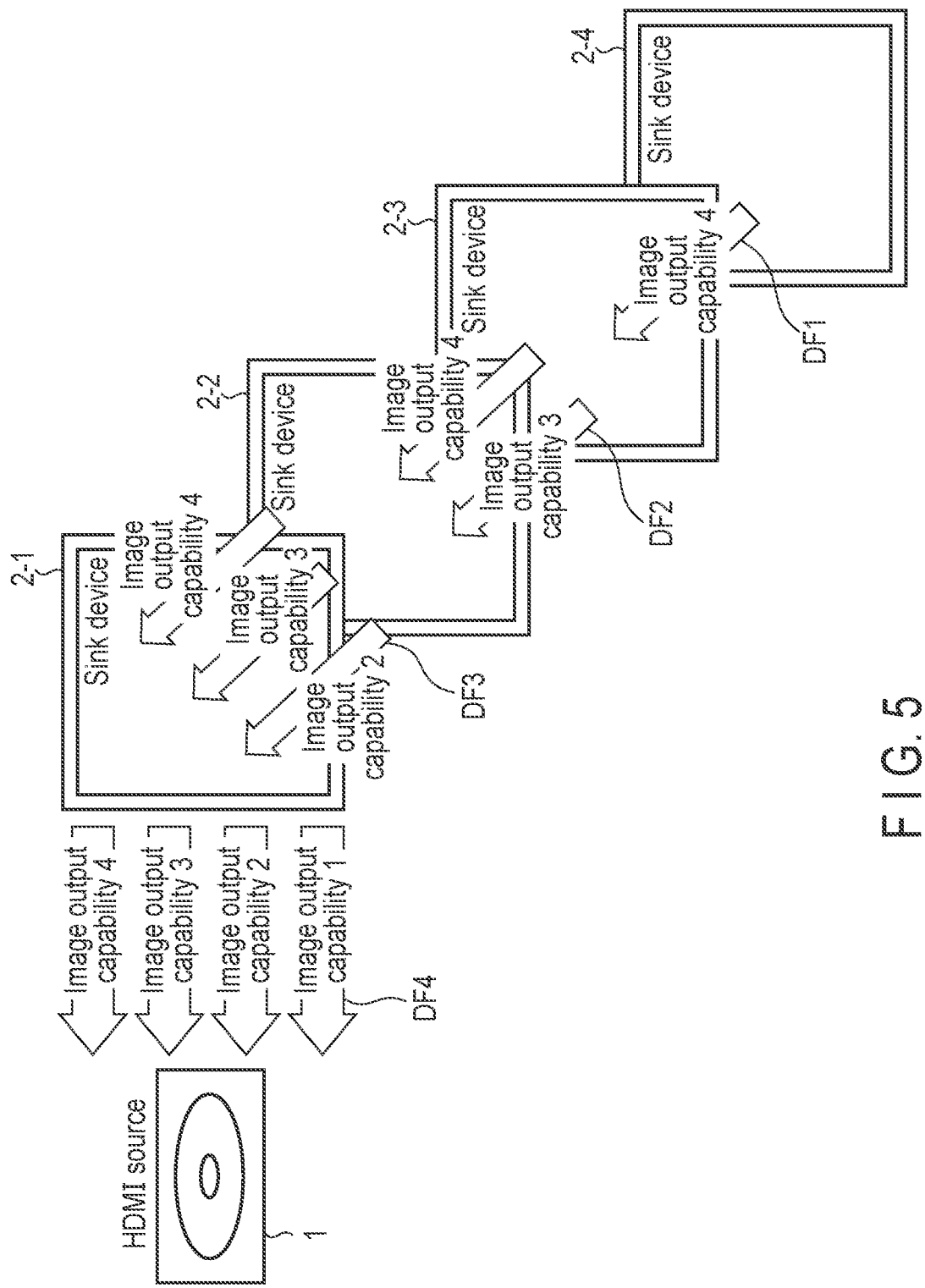
F I G. 5

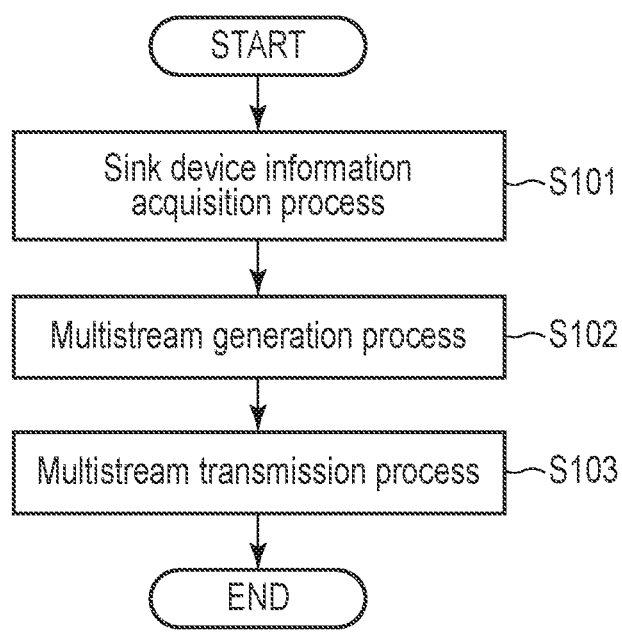
F I G. 8

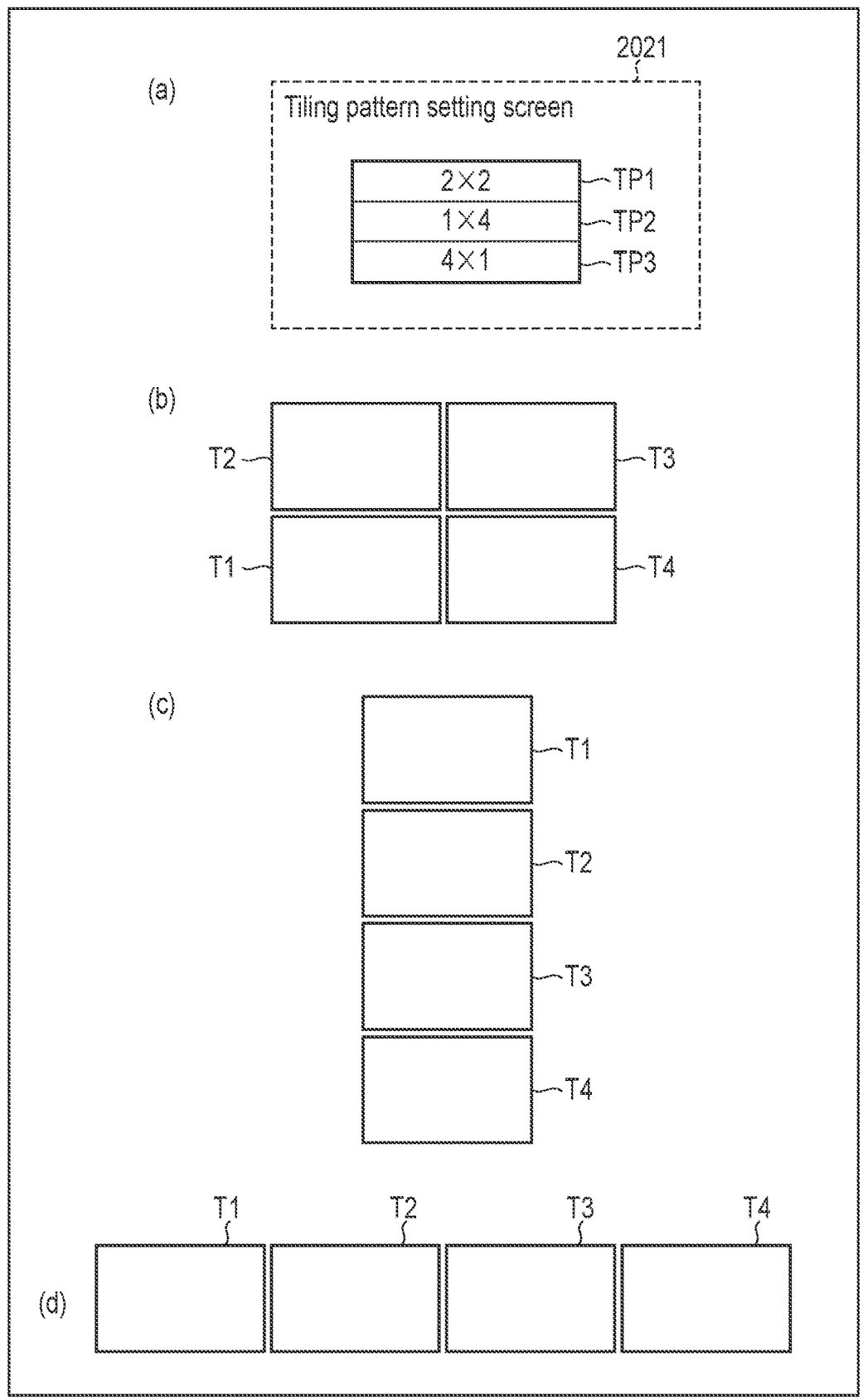
F I G. 10

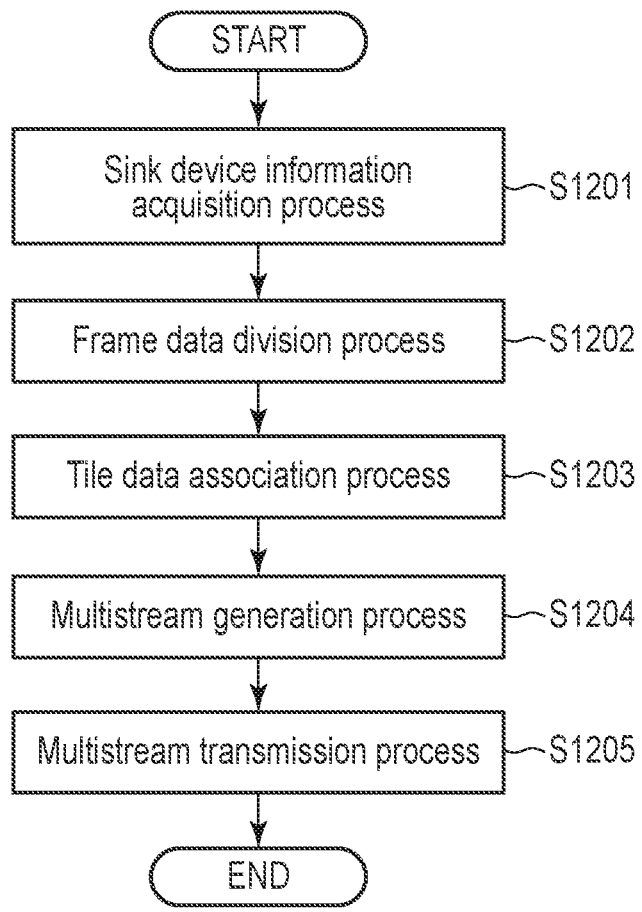
F I G. 11

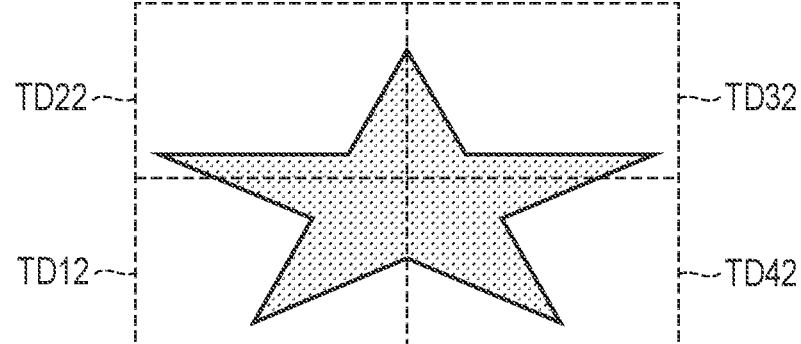
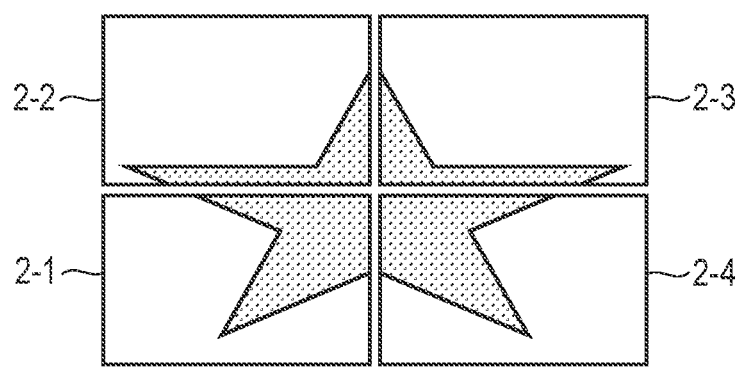
| Transmission data | Daisy chain stage number (stream number) | 3 | 2 | 1 | 0 |
|---|---|---|---|---|---|
| | Tile data item | TD12 | TD22 | TD32 | TD42 |
(c)
F I G. 13

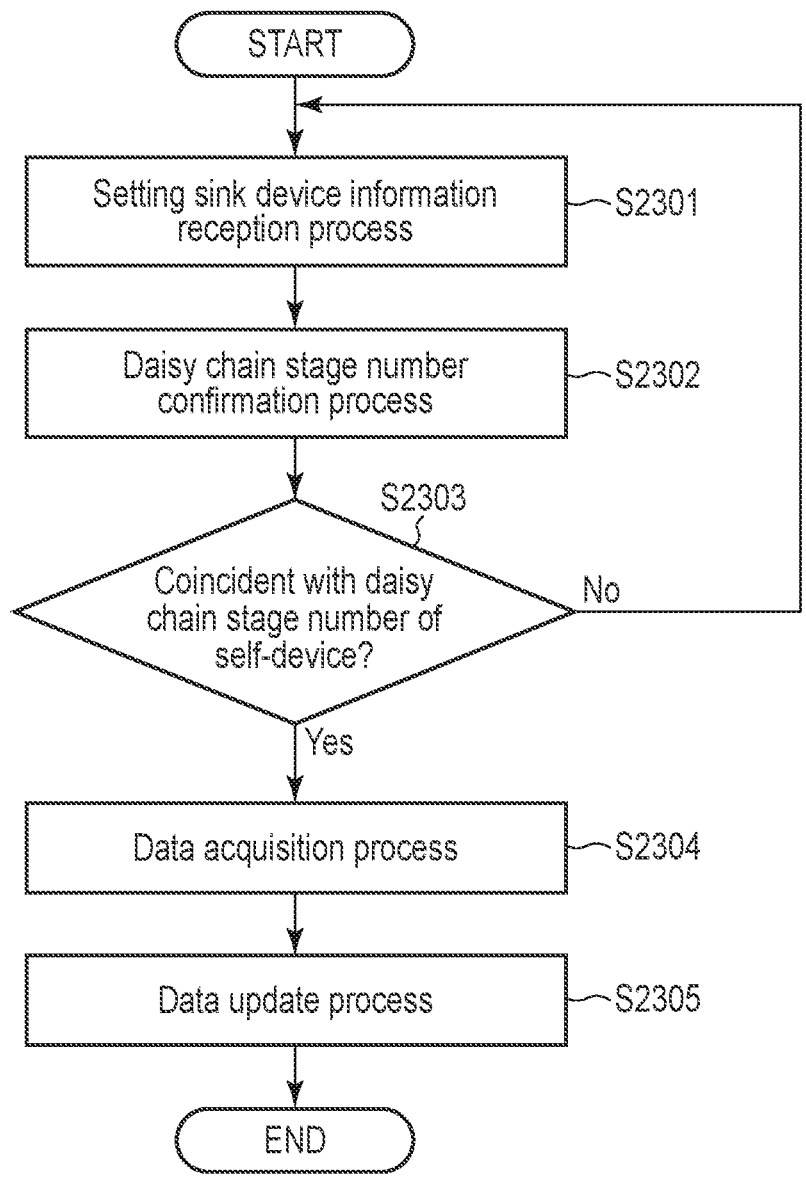
F I G. 19

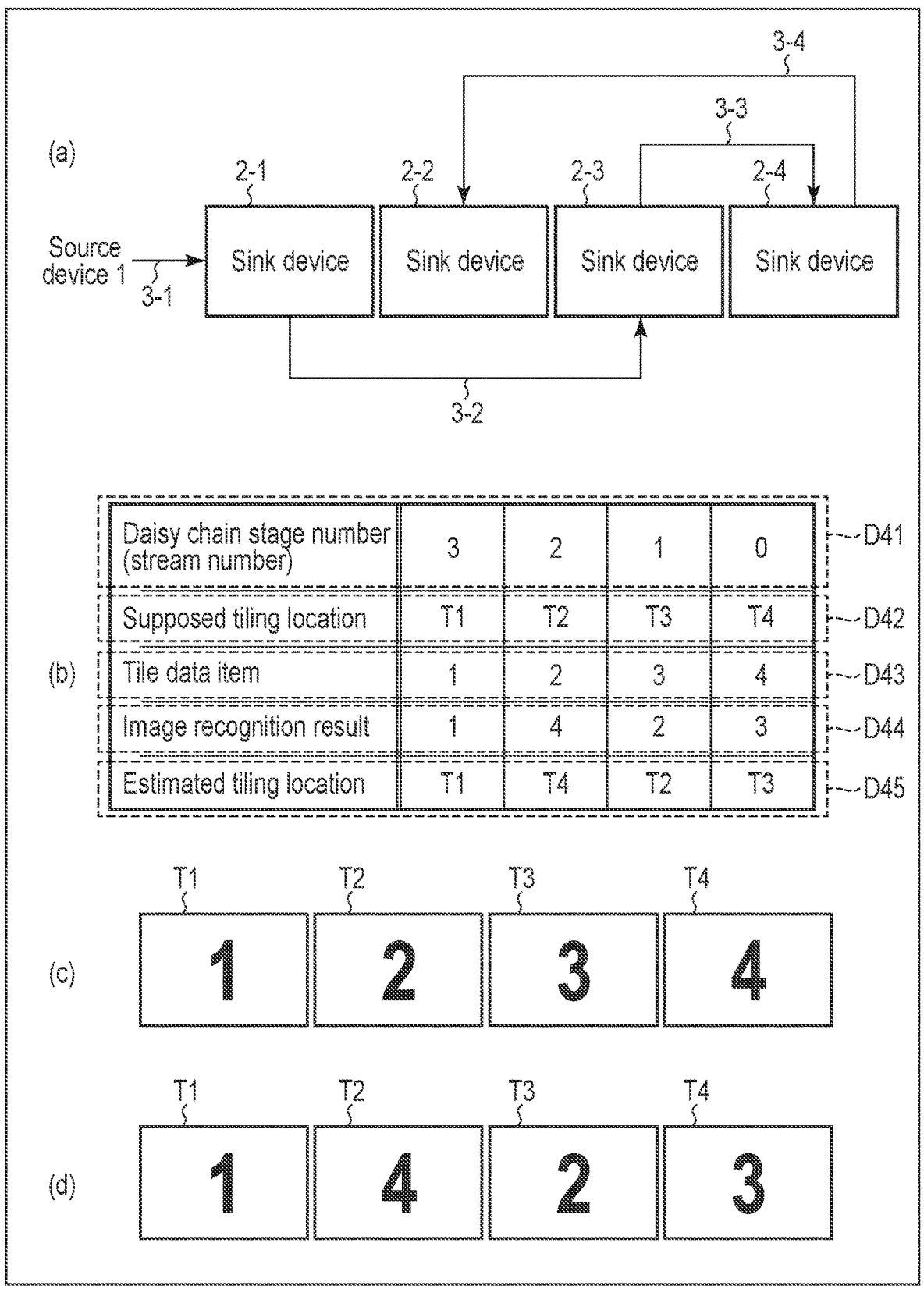
F I G. 20

SOURCE DEVICE AND SINK DEVICE

CROSS-REFERENCE TO RELATED APPLICATIONS

This application is based upon and claims the benefit of priority from Japanese Patent Application No. 2022-039404, filed Mar. 14, 2022, the entire contents of which are incorporated herein by reference.

FIELD

Embodiments described herein relate generally to a source device and a sink device for transmitting and receiving a multistream signal.

BACKGROUND

After HDMI (registered trademark) 2.1a, the standardization of multistream signal transmission is planned. Multistream transmission enables a plurality of video streams to be multiplexed into one HDMI video signal and to be transmitted and received by using one HDMI cable. A multistream signal transmitted from a source device is received and displayed in a plurality of sink devices (displays) which are daisy-chained by an HDMI cable.

However, when tiling display is performed in a plurality of sink devices, tiling display may not be correctly performed depending on the locations of the sink devices.

Embodiments described herein aim to provide a source device and a sink device for transmitting a multistream signal to daisy-chained devices and displaying contents.

BRIEF DESCRIPTION OF THE DRAWINGS

FIG. 1 is a conceptual diagram of an HDMI multistream signal transmission system according to a first embodiment.

FIG. 2 is a block diagram showing a configuration example of a source device according to the first embodiment.

FIG. 4 is a diagram showing a configuration example of a multistream signal output from the source device according to the first embodiment.

FIG. 5 is a conceptual diagram of a process in which the source device reads the data of the sink device according to the first embodiment.

FIG. 8 is a flowchart showing a processing operation example in which the source device transmits a multistream signal according to the first embodiment.

FIG. 10 is a conceptual diagram showing a screen example in which a tiling pattern is set in a sink device according to a second embodiment.

FIG. 11 is a flowchart showing a processing operation example in which a source device transmits a multistream signal according to the second embodiment.

FIG. 13 is a diagram showing an example of an image transmitted by the source device and the obtained image data according to the second embodiment.

FIG. 19 is a flowchart showing a processing operation example in which a sink device receives and stores sink device information according to the third embodiment.

FIG. 20 is a diagram showing an example of a test pattern transmitted by the source device and tiling display in a tiling pattern according to modification example 1.

DETAILED DESCRIPTION

Figure 3:
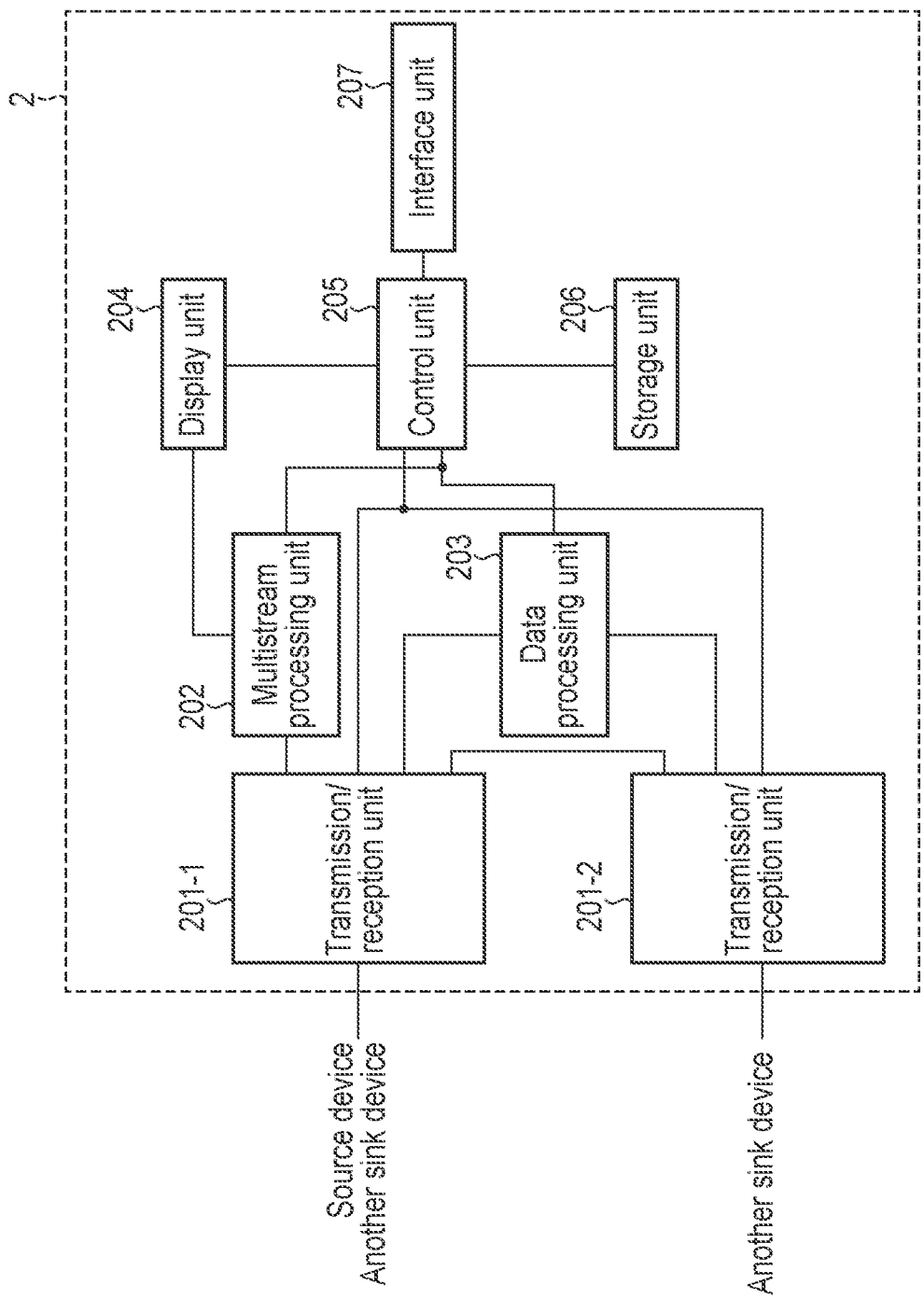
FIG. 3 is a block diagram showing a configuration example of a sink device according to the first embodiment.

Embodiments will be described hereinafter with reference to the accompanying drawings.

In general, according to one embodiment, a source device generates a multistream signal including contents streams transmitted to a plurality of sink devices which are connected by daisy-chaining and generates the multistream signal by associating daisy chain stage numbers of the sink devices with the contents streams for the sink devices.

First Embodiment

In a first embodiment, this specification shows an example in which a multistream signal transmitted from a source device is transmitted to four sink devices which are daisy-chained by HDMI 2.1.

In the present embodiment, the display capability (image output capability) of a sink device 2 is described in extended display identification data (EDID). A source device 1 reads this data and generates and transmits a video signal which can be displayed in the sink device 2. Similarly, in the configuration of a multistream, the display capability of the sink device 2 which is in the lowest location of the stream of the daisy chain connection is read by the nearest sink device 2 with a transmission port. The sink device 2 which read the display capability informs the upstream side of the read display capability of the downstream side and the display capability of the self-device. This operation is sequentially performed on the daisy chain. The display capabilities of all sink devices are ultimately reported to the source device 1.

FIG. 1 is a conceptual diagram of an HDMI multistream signal transmission system according to the first embodiment. The system of the present embodiment comprises the source device 1, sink devices 2-1, 2-2, 2-3 and 2-4 (referred to as the sink device 2 when they are not particularly distinguished from each other) and HDMI cables 3-1, 3-2, 3-3 and 3-4 (referred to as an HDMI cable 3 when they are not particularly distinguished from each other).

The source device 1 comprises a transmitter corresponding to the fixed rate link (FRL) transmission of HDMI 2.1 and a function of generating a multistream signal (HDMI multistream signal). An HDMI multistream signal is transmitted by a single HDMI cable 3.

The sink device 2 comprises a receiver and a transmitter corresponding to the FRL of HDMI 2.1. The source device 1 and the sink devices 2 are connected to each other by daisy-chaining using the HDMI cable 3. The sink device 2 receives an HDMI multistream signal from the source device 1 (upstream side), displays only a video signal relative to the self-device, and transmits the received HDMI multistream signal to the next sink device 2 (downstream side).

The HDMI cable 3 is a cable corresponding to the HDMI 2.1.

FIG. 2 is a block diagram showing a configuration example of the source device according to the first embodiment.

The source device 1 is a source device which supplies contents data such as an image and sound. For example, the source device 1 reproduces a disk such as a Blu-ray (registered trademark) disk and a DVD and outputs the reproduced contents data to the sink device 2 such as a display. The source device 1 comprises a computer comprising a CPU and a memory.

A transmission/reception unit 101 includes, for example, the function of the connector of the HDMI cable 3. The HDMI cable 3 is connected to the transmission/reception unit 101 such that the transmission/reception unit 101 exchanges data with an external device. The transmission/reception unit 101 generates packet data (FRL packet) corresponding to the FRL of HDMI 2.1 and outputs the packet data to the HDMI cable 3.

For example, a multistream generation unit 102 generates a stream such that contents data such as an image and sound conforms to the HDMI standard, and outputs the stream to the transmission/reception unit 101. More specifically, the multistream generation unit 102 generates a stream (multistream) for transmitting data to each sink device 2 by using information related to the sink device 2 (sink device information). The stream to each sink device 2 may be a data item prepared by dividing one video data item (program video data item), or may be a video data item which is independent and different from the other video data items, or may be an arbitrary video data item.

A data processing unit 103 receives data such as the sink device information output by the sink device 2, processes the data and outputs the data to a control unit 105, etc.

For example, a data output unit 104 outputs contents data such as an image and sound obtained from a DVD, a digital broadcasting receiver (not shown), etc.

The control unit 105 controls the various functions of the source device 1 based on a command signal received from a remote control (not shown), etc.

A storage unit 106 is a memory and stores data such as the sink device information obtained by the data processing unit 103.

An interface unit 107 is an interface with a peripheral device such as a remote control. The interface unit 107 receives a command signal, etc., and outputs it to the control unit 105, etc. The interface unit 107 may be connectable to an arbitrary device such as the keyboard or mouse of a personal computer.

FIG. 3 is a block diagram showing a configuration example of the sink device according to the first embodiment.

Each of transmission/reception units 201-1 and 201-2 (referred to as the transmission/reception unit 201 when they are not particularly distinguished from each other) includes, for example, the function of the connector of the HDMI cable 3. The HDMI cable 3 is connected to transmission/reception units 201-1 and 201-2 such that transmission/reception units 201-1 and 201-2 exchange data with an external device.

Transmission/reception unit 201-1 transmits and receives data relative to the device on the upstream side of the daisy chain (on the source device 1 side). Transmission/reception unit 201-1 receives an FRL packet, setting data, etc., from the HDMI cable 3 and outputs them to a control unit 205.

Transmission/reception unit 201-2 transmits and receives data relative to the device on the downstream side of the daisy chain (on the side without the source device 1). Transmission/reception unit 201-2 receives an FRL packet which is received and output by transmission/reception unit 201-1, and outputs the FRL packet to the HDMI cable 3.

The sink device 2 has the function of hot plug detection (HPD). When another device is electrically connected to the sink device 2 via the HDMI cable 3, for example, the transmission/reception unit 201 transmits a detection signal to the control unit 205. By this operation, the control unit 205 recognizes that another device is connected to the upstream or downstream side of the self-device via the HDMI cable 3. The function of HPD may be also provided in the source device 1 in the same manner.

A multistream processing unit 202 confirms the header of the received FRL packet, obtains stream data (payload) data relative to the self-device and outputs the contents data included in the obtained stream data to a display unit 204.

A data processing unit 203 receives and processes data such as the sink device information output from another sink device 2, and outputs the data to the transmission/reception unit 201, the control unit 205, etc.

The display unit 204 is, for example, a display, and may display the contents data output by the multistream processing unit 202 and display the setting screen data output by the control unit 205.

The control unit 205 controls the various functions of the sink device 2 based on a command signal received from a remote control, etc. The control unit 205 causes the display unit 204 to display setting screen data. The control unit 205 can detect the turning-on of a device which is connected via the HDMI cable 3 by receiving a detection signal from the transmission/reception unit 201 by the function of HPD, etc. For example, when the control unit 205 receives a detection signal from transmission/reception unit 201-1, the control unit 205 detects the connection of a device which is turned on on the upstream side. When the control unit 205 receives a detection signal from transmission/reception unit 201-2, the control unit 205 detects the connection of a device which is turned on on the downstream side.

A storage unit 206 is a memory, and has an area for storing the information of the image output capability of the sink device 2 called EDID and a storage area called enhanced extended display identification data (EEDID). EDID may be included in EEDID to be integrated as EEDID.

An interface unit 207 is an interface with a peripheral device such as a remote control. The interface unit 207 receives a command signal, etc., and outputs it to the control unit 205, etc. The interface unit 207 may be connectable to an arbitrary device such as the keyboard or mouse of a personal computer.

FIG. 4 is a diagram showing a configuration example of a multistream signal output from the source device according to the first embodiment.

In the standards after HDMI 2.1, FRL transmission is supported, and contents data such as video data can be packetized (FRL-packetized) to be transmitted.

FIG. 4(a) shows a configuration example of four streams included in a multistream signal transmitted by a single HDMI cable 3. Each stream STR includes a plurality of FRL packets corresponding to the FRL of HDMI 2.1.

FIG. 4(b) is a configuration example of an FRL packet. The FRL packet consists of a header and data.

The data includes contents data, etc. The header includes the other information. In the present embodiment, a multistream signal is transmitted. Thus, a map value (FRL packet map: 6 bits) which differs depending on the stream such as an image frame is allocated to the header.

FIG. 4(c) is a configuration example of the map value included in the header of the FRL packet. The map value consists of 2 bits defined in the format defined by HDMI 2.1 and undefined 4 bits.

FIG. 4(d) shows a setting example of the undefined 4 bits of the map value. In the present embodiment, regarding the 4 higher bits of the map value, the most significant bit is a multistream signal bit (0: non-multistream signal, 1: multistream signal), and the 3 lower bits (0-7) are a stream number. A unique number which differs depending on the stream is allocated to the stream number. In the present embodiment, the daisy chain stage number of the sink device 2 which is the stream transmission destination or a value equivalent to the daisy chain stage number is allocated to the stream number. The daisy chain stage number is described later. By this configuration, an arbitrary stream can be allocated to an arbitrary sink device 2 which is daisy-chained.

FIG. 4(e) is an example of a case where multistream signal identification information (a multistream signal bit and a stream number) is stored in the format defined by HDMI 2.1a. In a manner similar to that of this example, a multistream signal bit (0: non-multistream signal, 1: multistream signal) may be stored in bit 2 of bit location BA101, and a stream number may be stored in bit 3 to bit 5.

In the present embodiment, the allocation information of a multistream signal such as a stream number is inserted into the header of an FRL packet. However, for example, the InfoFrame data defined in HDMI may be extended. The allocation information may be stored in the extended portion.

FIG. 4(f) is an example of a case where multistream signal identification information (a multistream signal bit and a stream number) is stored in the format defined by the Info data. In a manner similar to that of this example, multistream signal identification information (a multistream signal bit and a stream number) may be stored in byte area BA123.

Now, this specification explains a process in which the source device 1 reads the data of the sink device 2.

The sink device 2 allocates its image output capability to a storage area called EEDID. The source device 1 reads the EEDID of the sink device 2 and confirms the image output capability of the sink device 2. To read EDID or EEDID, the DDC line of the HDMI cable 3 defined by the HDMI specification is used. In the configuration of FIG. 1 in which daisy-chain connection is applied, the source device 1 needs to read the capability information of all of the sink devices 2 which are connected by daisy-chaining.

FIG. 5 is a conceptual diagram of a process in which the source device reads the data of a sink device according to the first embodiment. It is assumed that the source device 1 is connected to each sink device 2 in the same manner as FIG. 1.

A sink device 2 starts reading EEDID, using the hot plug detection (HPD) of the transmission end (equivalent to sink device 2-4) as a trigger. At this time, the sink device 2 prohibits the reading operation of the EEDID of the self-device relative to the upstream side until the reading operation of the EEDID of the downstream side is completed. It should be noted that HPD may be turned on.

In sink device 2-4 which is the last stage of the daisy chain, a timeout occurs as the HPD of the transmission end is not turned on. Sink device 2-4 configures its EEDID and enables the reading operation of the EEDID.

Sink device 2-3 reads the EEDID of sink device 2-4 connected to the transmission end (downstream side) (data flow DF1) and informs the upstream sink device 2-2 of the read EEDID with the EEDID of the self-device (data flow DF2). Sink device 2-2 informs the upstream sink device 2-1 of the data with the EEDID of the self-device (data flow DF3). Ultimately, the EEDID of all of the sink devices 2 is loaded to the source device 1 (data flow DF4).

Now, this specification explains a process in which each sink device 2 determines the daisy-chain stage number of the self-device and transmits it upstream.

Figure 6:
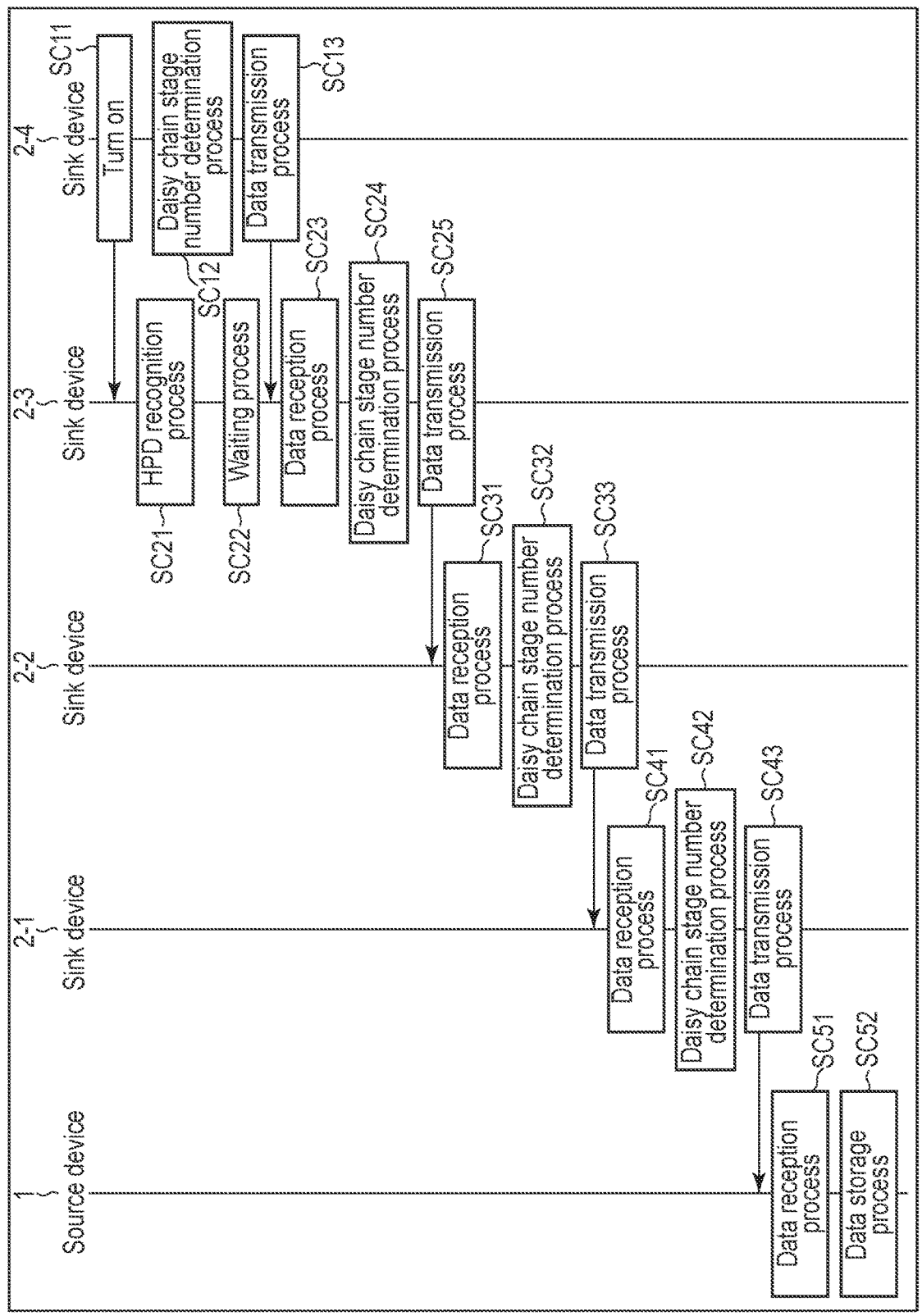
FIG. 6 is a sequence chart showing an operation example of a process of reading the data of the sink device according to the first embodiment.

FIG. 6 is a sequence chart showing operation in which the sink device of the first embodiment determines and transmits the daisy chain stage number of the self-device.

Sink device 2-4 is assumed to be the transmission end. It is assumed that sink device 2-4 performs electrical connection for sink device 2-3 (step SC11). As HPD is turned on, sink device 2-3 recognizes the electrical connection of sink device 2-4 (step SC21). After step SC21, sink device 2-3 waits for a response from sink device 2-4 (step SC22). A timeout occurs in sink device 2-4 as the HPD of the transmission end is not turned on. Sink device 2-4 recognizes that the self-device is the transmission end and determines its daisy chain stage number as, for example, zero (step SC12). Sink device 2-4 stores its daisy chain stage number in EEDID and transmits the data of the EEDID as sink device information (step SC13).

Figure 7:
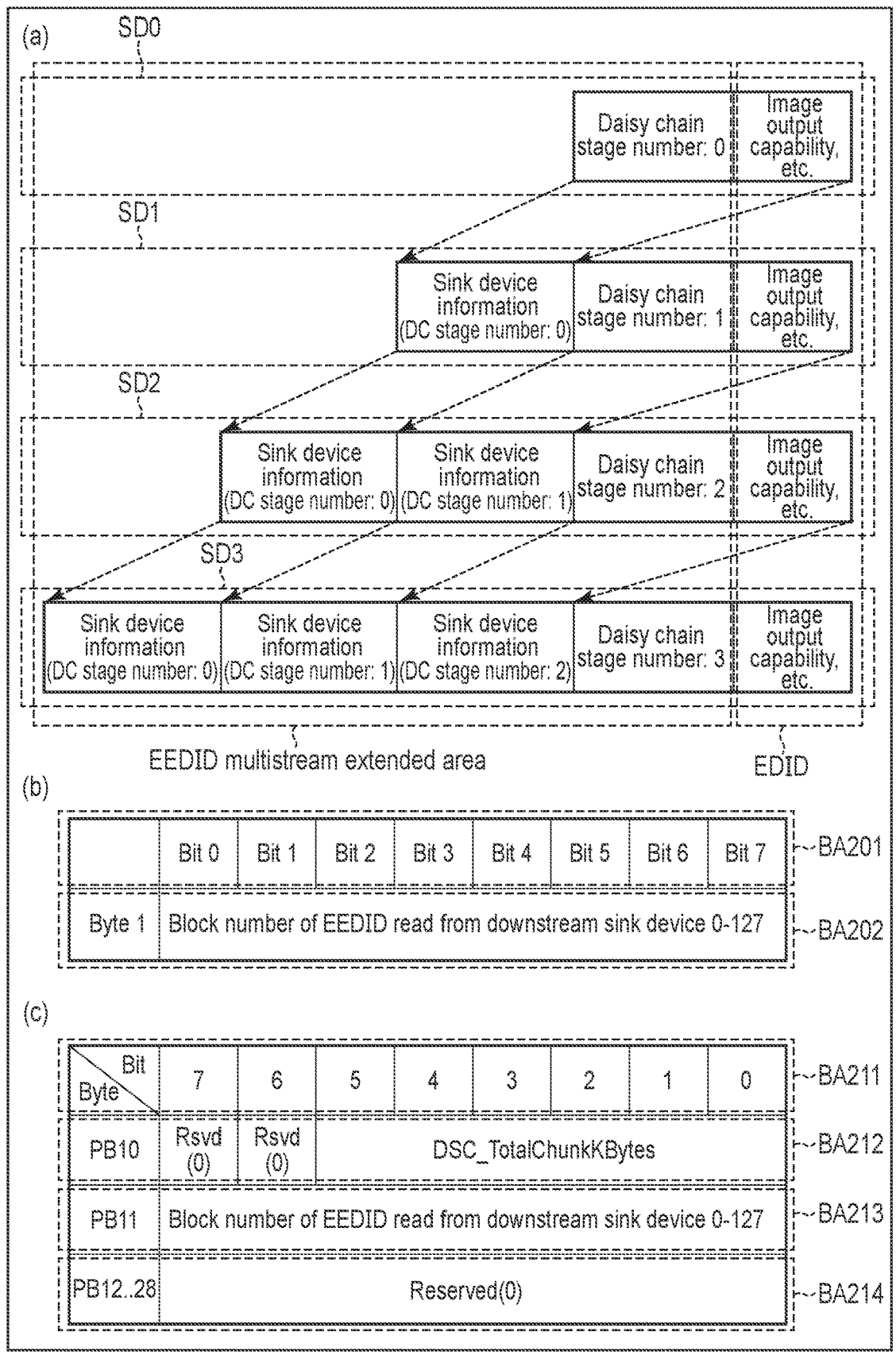
FIG. 7 is a conceptual diagram showing an example of sink device information read in the first embodiment.

FIG. 7 is a conceptual diagram showing sink device information read in the first embodiment.

FIG. 7(a) is an example of sink device information SD0, SD1, SD2 and SD3 transmitted by sink devices 2-4, 2-3, 2-2 and 2-1, respectively. In the present embodiment, sink device information includes the image output capability of EDID and the daisy chain stage number (DC stage number) of EEDID. In EEDID, each block consists of 128 bytes. In the EEDID of each sink device 2, the block number of the EEDID of the self-device is included. In the daisy chain configuration, for example, the block number of the EEDID read from the downstream side is stored in the multistream extended area of the EEDID of the self-device, and the EEDID read from the downstream side is allocated so as to be continuous with the EEDID of the self-device (with a successive block address). Each sink device 2 can know the daisy chain stage number (DC stage number) by reading and analyzing (or parsing) the block number of the EEDID of the self-device and the EDID read from the downstream side.

Sink device information SD0 is an example of sink device information transmitted from sink device 2-4 to sink device 2-3 in step SC13 of FIG. 6. Sink device information SD1 is an example of sink device information in which sink device 2-3 stores the EDID and EEDID of sink device information SD0 in the multistream extended area (EEDID) and which is transmitted to sink device 2-2. Sink device information SD2 is an example of sink device information in which sink device 2-2 stores sink device information SD1 in the multistream extended area and which is transmitted to sink device 2-1. Sink device 2-1 connected to the source device 1 transmits sink device information SD3 including the sink device information of the self-device and the sink device information from the downstream side to the source device 1. By this operation, the source device 1 and each sink device 2 are allowed to read, from the nearest sink device 2, the sink device information of all of the sink devices 2 connected to the downstream side.

Each sink device 2 stores the daisy chain stage number in the EEDID (multistream area) of the storage unit 206 of the self-device. The daisy chain stage number of the sink device 2 of the last stage is set so as to be zero. The sink device 2 which read this data adds one to the read number and determines it as the stage number of the self-device. Thus, the daisy chain stage number indicates the connection order of the daisy-chained sink device 2. By the daisy chain stage number, the source device 1 can specify the location (connection order) of an arbitrary sink device 2. Each sink device 2 can also recognize the connection location of the self-device by the daisy chain stage number of the self-device. By the daisy chain stage number, the source device 1 can also recognize the number of daisy-chained sink devices 2.

FIG. 7(b) is an example of sink device information SD0 of FIG. 7(a). The example shows a case where the block number of the EEDID read from the downstream sink device 2 (equivalent to the daisy chain stage number of the self-device) is stored in the EEDID area in the format defined by HDMI 2.1a. In a manner similar to that of this example, the block number of the EEDID read from the downstream sink device 2 of the EEDID may be stored in byte area BA202 of the EEDID area. The example in which byte area BA202 has 8 bits can correspond to daisy chain connection for up to 128 sink devices 2.

FIG. 7(c) is an example of or after sink device information SD1 of FIG. 7(a). The example shows a case where the sink device information of the downstream sink device 2 including the block number of the EEDID read from the downstream sink device 2 (equivalent to the daisy chain stage number of the self-device) is stored in the EEDID area in the format defined by HDMI 2.1a. In a manner similar to that of this example, the block number of the EEDID read from the downstream sink device 2 of the EEDID (equivalent to the daisy chain stage number of the self-device) may be stored in PB11 of byte area BA213 of the EEDID area with 8 bits. Further, the sink device information received from the downstream sink device 2 may be stored in byte area BA213.

Returning to FIG. 6, when sink device 2-3 receives the sink device information transmitted by sink device 2-4 (step SC23), sink device 2-3 confirms that the daisy chain stage number of the nearest downstream sink device 2-4 is zero and determines its daisy-chain stage number as one (step SC24). Sink device 2-3 stores the daisy chain stage number of the self-device in the EEDID area of the storage unit 206 of the self-device, further stores the received sink device information of sink device 204 in the multistream extended area, generates sink device information SD1 of FIG. 7 and transmits sink device information SD1 to the nearest upstream sink device 2-2 (step SC25).

In a manner similar to that of sink device 2-3, when sink device 2-2 receives the sink device information transmitted by sink device 2-3 (step SC31), sink device 2-2 confirms that the daisy-chain stage number of the nearest downstream sink device 2-3 is one and determines its daisy chain stage number as two (step SC32). Sink device 2-2 stores the daisy chain stage number of the self-device in the EEDID area of the storage unit 206 of the self-device, further stores the sink device information received from sink device 2-3 in the multistream extended area, generates sink device information SD2 of FIG. 7 and transmits sink device information SD2 to the nearest upstream sink device 2-1 (step SC33).

In a manner similar to that of sink device 2-2, sink device 2-1 stores the determined daisy chain stage number of the self-device in the EEDID area of the self-device, further stores the sink device information received from sink device 2-2 in the multistream extended area, generates sink device information SD3 of FIG. 7 and transmits sink device information SD3 to the nearest upstream sink device 2-1 (step SC43). The source device 1 may receive sink device information SD3 from sink device 2-1 (step SC51) and store it in the storage unit 106 (step SC52).

By the above procedure, the source device 1 can obtain the sink device information of daisy-chained sink devices 2.

Now, this specification explains the procedure of the transmission of a multistream signal. For example, it is assumed that a user transmits a display command to the source device 1 by a remote control, etc., to cause four daisy-chained sink devices 2 to display video contents. The source device 1 generates a multistream signal as shown in FIG. 4(a) using the sink device information which is obtained in advance.

FIG. 8 is a flowchart showing processing operation in which the source device transmits a multistream signal according to the first embodiment.

The source device 1 which received a display command obtains the sink device information obtained from the daisy-chained sink device 2 from the storage unit 106 (step S101).

The source device 1 generates the stream for each sink device 2 (step S102). In step S102, the multistream generation unit 102 extracts the daisy chain stage number of the sink device 2 which is the stream transmission destination from the sink device information and sets the number in the stream number so as to be the destination of the stream. Further, the source device 1 generates the stream of an FRL packet relative to each sink device 2 by setting 1 to the multistream signal bit and inserting the video data to be transmitted into the data of FIG. 4(b) for each sink device 2. Hereinafter, this operation is more specifically explained.

For example, this specification explains a case where stream STR1 of FIG. 4(a) is generated relative to sink device 2-1. The multistream generation unit 102 inserts the daisy chain stage number "3" of sink device 2-1 and the multistream signal bit "1" into the header of FIG. 4(b), inserts the video data (contents data) to be displayed in the display unit 204 of sink device 2-1 into the data of FIG. 4(b) and generates the FRL packet of stream STR1 relative to sink device 2-1. Relative to the other sink devices 2, similarly, the stream of the FRL packet is generated.

The source device 1 transmits the generated streams (multistream signal) (step S103). In step S103, the stream signals may not be necessarily transmitted by different channels in parallel, and unlike FIG. 4(a), the FRL packets of the streams may be transmitted by a single channel by multiplexing, etc. In an example of the present embodiment, the FRL packets of all streams are present in a single channel.

Figure 9:
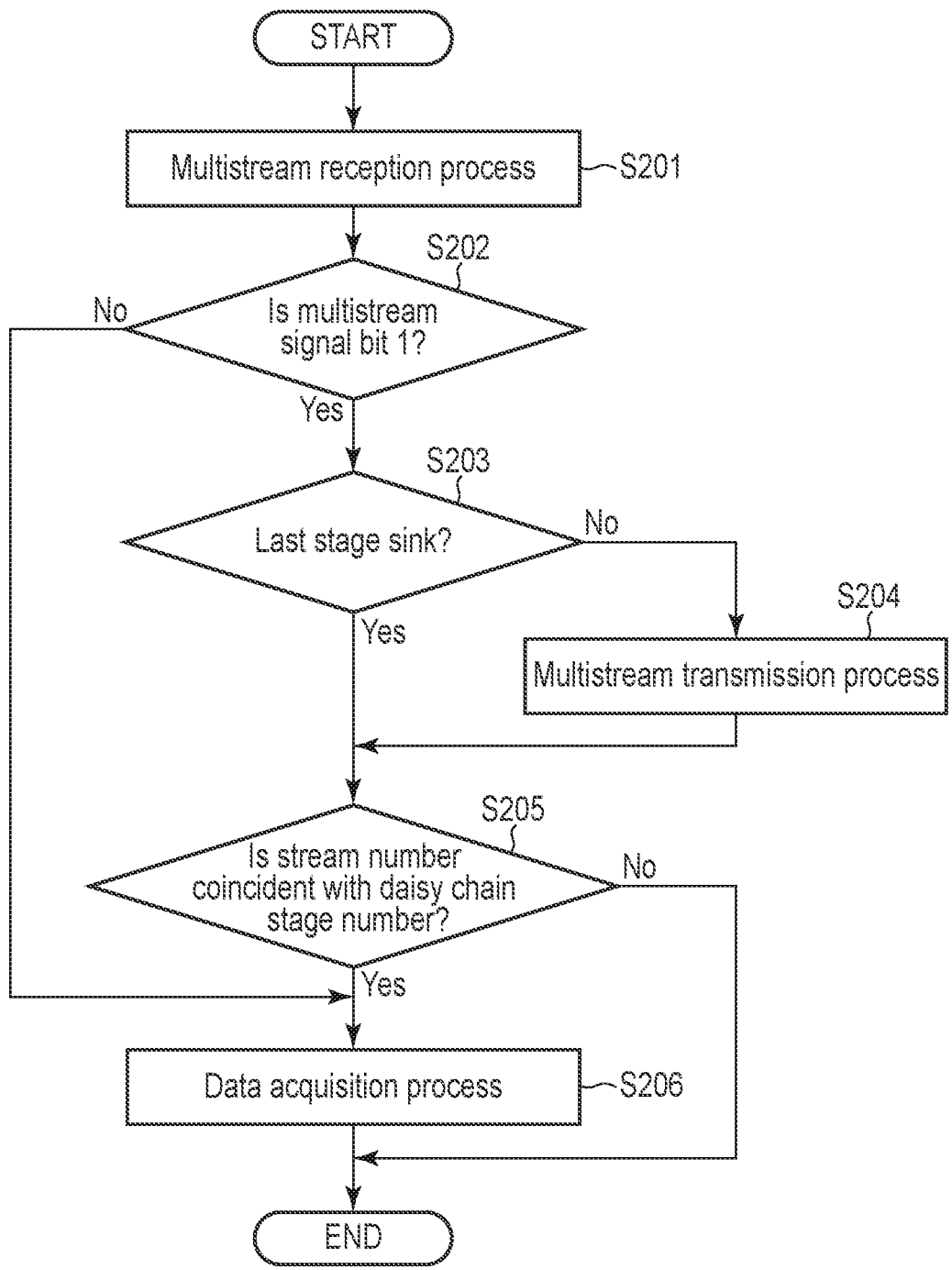
FIG. 9 is a conceptual diagram showing an example of the data of the sink device read by the system according to the first embodiment.

FIG. 9 is a flowchart showing a processing operation example in which a sink device receives a multistream signal according to the first embodiment. The multistream signal output from the source device 1 is transmitted by the HDMI cable 3 and received by the upstream sink device 2 as shown in FIG. 1. Now, this specification explains the reception process of each sink device 2.

From HDMI cable 3-1, sink device 2-1 receives the multistream signal (FRL packet) output from the source device 1 (step S201). Sink device 2-1 confirms the value of the multistream signal bit of the header of each of the received FRL packets. When the value is 1 (Yes in step S202), sink device 2-1 confirms whether or not the self-device is the last stage of the daisy chain (step S203). Sink device 2-1 outputs the received multistream signal to the downstream sink device 2-2 (step S204) as the self-device is not the last stage (No in step S203). Sink device 2-1 confirms the stream number included in the received FRL packet (step S205) and obtains contents data from the FRL packet having the stream number which is coincident with the daisy chain stage number of the self-device (step S206). Sink device 2-1 may cause the display unit 204 to display contents data. When the multistream signal bit of the FRL packet header is not 1 (No in step S202), sink device 2-1 may obtain contents data from the received FRL packet (step S206) and cause the display unit 204 to display contents data.

From HDMI cable 3-2, sink device 2-2 receives the stream signal output from sink device 2-1 (step S201). When the multistream signal bit of the FRL packet header is 1 (Yes in step S202), sink device 2-2 confirms whether or not the self-device is the last stage of the daisy chain (step S203). Sink device 2-2 confirms whether or not the self-device is the last stage of the daisy chain. Since sink device 2-2 is not the last stage (No in step S203), sink device 2-2 outputs the received multistream signal to the downstream sink device 2-3 (step S204). Sink device 2-2 confirms the stream number included in the received FRL packet (step S205) and obtains contents data from the FRL packet having the stream number which is coincident with the daisy chain stage number of the self-device (step S206). Sink device 2-2 may cause the display unit 204 to display contents data. When the multistream signal bit of the FRL packet header is not 1 (No in step S202), sink device 2-2 may obtain contents data from the received FRL packet (step S206) and cause the display unit 204 to display contents data. As sink device 2-3 operates in a manner similar to that of sink device 2-2, explanation thereof is omitted.

From HDMI cable 3-4, sink device 2-4 receives the stream signal output from sink device 2-3 (step S201). When the multistream signal bit of the FRL packet header is 1 (Yes in step S202), sink device 2-4 confirms whether or not the self-device is the last stage of the daisy chain (step S203). Since sink device 2-4 is the last stage (Yes in step S203), sink device 2-4 confirms the stream number included in the received FRL packet (step S205) and obtains contents data from the FRL packet having the stream number which is coincident with the daisy chain stage number of the self-device (step S206). Sink device 2-4 may cause the display unit 204 to display contents data.

By the above procedure, the source device 1 can transmit video data to the sink devices 2 which are daisy-chained by the HDMI cable 3. Each sink device 2 can receive the stream transmitted to itself and display the contents data included in the stream.

Second Embodiment

A second embodiment shows an example in which a source device 1 transmits a multistream signal to four daisy-chained sink devices 2 by using the tiling information of the sink devices 2 such that tiling display is performed in each of the sink devices 2.

In the present embodiment, the source device 1 obtains the allocation information with the tiling pattern constructed by a plurality of sink devices 2 and the tiling pattern of each sink device 2 in addition to the daisy chain stage number obtained in the first embodiment.

For example, an image of 8K is multiplexed into a multistream signal of 4K×4, and tiling display is performed in four sink devices 2 (for example, 4K displays). To appropriately perform tiling display, the source device 1 needs to know tiling information such as the physical allocation locations of a plurality of sink devices 2 and generate a multistream signal. Each sink device 2 extracts the video signal (stream) specified by the source device 1 from the multistream signal and displays the extracted video signal. The present embodiment shows an example of a case where a user sets tiling information by using the GUI, etc., of the sink devices 2 in the sink devices 2 from a remote control, etc.

FIG. 10 is a conceptual diagram showing a screen example in which a tiling pattern is set in a sink device according to the second embodiment.

FIG. 10(a) is an example of the tiling pattern setting screen displayed by the display unit 204 of each sink device 2. In the example, the user can select a tiling pattern from three tiling patterns TP1, TP2 and TP3.

FIG. 10(b) to FIG. 10(d) show examples of the tiling patterns of displays corresponding to tiling patterns TP1, TP2 and TP3 of FIG. 10(a), respectively. Various patterns can be considered for a tiling pattern which consists of a plurality of sink devices 2. As tiling which consists of four sink devices, typically, the three patterns of FIG. 10(b) to FIG. 10(d) are considered. Each of the daisy-chained sink devices 2 may have an area indicating a tiling pattern in the multistream extended area of the EEDID of the self-device.

In FIG. 10(b) to FIG. 10(d), T1 to T4 denote the tiling locations of displays. The tiling locations are the location information of the sink devices 2 in each tiling pattern and may be stored in the multistream extended areas of the EEDID of the sink devices 2. By this information, the source device 1 can recognize the location of each sink device 2 in each tiling pattern. Each sink device 2 can also recognize the location of the self-device in each tiling pattern.

In FIG. 10(a), tiling pattern TP1 is an example of a case where four displays are provided in a form of 2×2 as shown in FIG. 10(b). Tiling pattern TP2 is an example of a case where four displays are provided in a form of 1×4 as shown in FIG. 10(c). Tiling pattern TP3 is an example of a case where four displays are provided in a form of 4×1 as shown in FIG. 10(d).

For example, when the user transmits a display command of a tiling pattern setting screen to a sink device 2 with a remote control, etc., the sink device 2 displays the screen of FIG. 10(a). When the user further selects a tiling pattern on the screen of FIG. 10(a), the screens of FIG. 10(b) to FIG. 10(d) may be displayed. When the user selects one of tiling locations T1 to T4 on the screens of FIG. 10(*b*) to FIG. 10(*d*), the selected tiling pattern may be set in the sink device 2.

Each sink device 2 stores, in a storage unit 206, the selected tiling pattern and the selected tiling location (one of tiling locations T1 to T4). For example, it is assumed that the tiling pattern should be TP1, and sink device 2-1 should be physically provided in the location of T1 of FIG. 10(*b*). In this case, when the user selects tiling location T1 on the screen of FIG. 10(*b*), setting is applied to sink device 2-1 such that the tiling pattern is TP1 and the tiling location is T1. Relative to each of the four sink devices 2, the user sets tiling information including a tiling pattern and a tiling location.

As described above, in a method in which, for example, the user specifies the tiling pattern and the tiling location, each sink device 2 updates the information of the EEDID of the self-device stored in the storage unit 206, etc., based on the set information. Hereinafter, this specification shows an example of a case where sink devices 2-1, 2-2, 2-3 and 2-4 are provided and set in tiling locations T1, T2, T3 and T4 of tiling pattern TP1, respectively.

FIG. 11 is a flowchart showing a processing operation example in which the source device transmits a multistream signal according to the second embodiment.

The source device 1 which received a display command from the user obtains the sink device information obtained from a daisy-chained sink device 2 from a storage unit 106 (step S1201). The procedure in which the source device 1 obtains sink device information from each sink device 2 may be that of the sequence chart of FIG. 6 in a manner similar to that of the first embodiment. In this regard, however, in the second embodiment, the sink device information further includes tiling information. The source device 1 stores the obtained sink device information in the storage unit 106.

Figure 12:
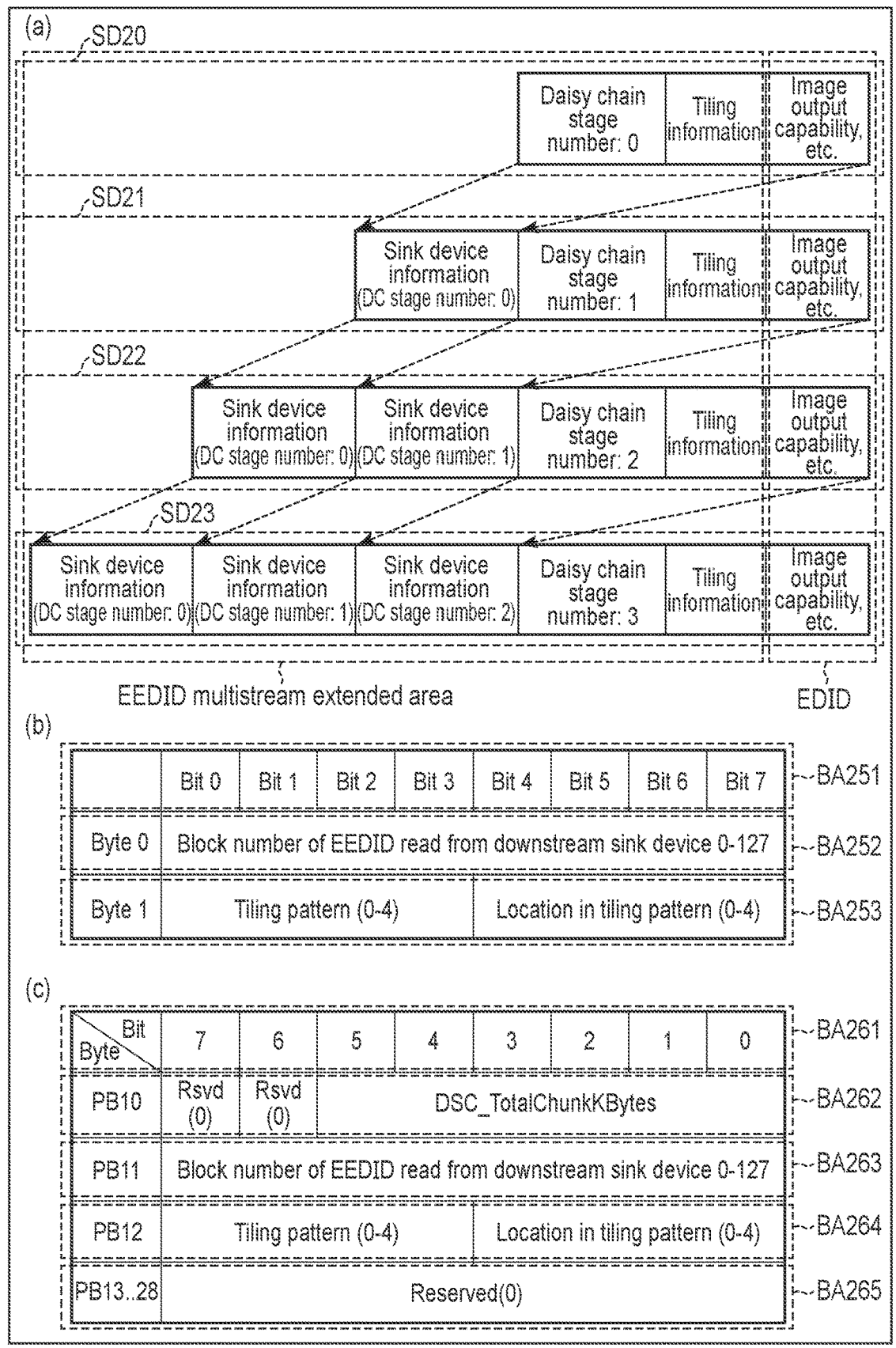
FIG. 12 is a conceptual diagram showing an example of sink device information read in the second embodiment.

FIG. 12 is a conceptual diagram showing an example of sink device information read in the second embodiment.

FIG. 12(*a*) is an example of sink device information SD20, SD21, SD22 and SD23 transmitted from sink devices 2-4, 2-3, 2-2 and 2-1 to adjacent sink devices, respectively. In the present embodiment, EEDID includes basic data such as the image output data read from the downstream sink device 2, a daisy chain stage number and tiling information. Each sink device 2 receives tiling information in accordance with the time chart of FIG. 6, etc., and stores it in the storage unit 206 in a manner similar to that of a daisy chain stage number. Sink devices 2-4, 2-3, 2-2 and 2-1 store sink device information SD20, SD21, SD22 and SD23 in the EEDID areas and EDID areas of the respective storage units 206.

FIG. 12(*b*) is an example of sink device information SD20 of FIG. 12(*a*). The example shows a case where the block number of the EEDID read from the downstream sink device 2 (equivalent to the daisy chain stage number of the self-device) and tiling information (a tiling pattern and a tiling location) are stored in the format defined by HDMI 2.1*a*. In a manner similar to that of this example, the tiling pattern and tiling location (in other words, the location in the tiling pattern) of the self-device may be stored in byte area BA253 of the EEDID area with 8 bits.

FIG. 12(*c*) is an example of or after sink device information SD21 of FIG. 12(*a*). The example shows a case where the sink device information of the downstream sink device 2 including the block number of the EEDID read from the downstream sink device 2 (equivalent to the daisy chain stage number of the self-device) and tiling information (a tiling pattern and a tiling location) is stored in the EEDID area in the format defined by HDMI 2.1*a*. In a manner similar to that of this example, the block number of the EEDID read from the downstream sink device 2 (equivalent to the daisy chain stage number of the self-device) and the tiling information (a tiling pattern and a tiling location) of the self-device are stored in byte areas BA263 and BA 264 of the EEDID area. Further, the sink device information received from the downstream sink device 2 may be stored in byte area BA265.

Returning to FIG. 11, the source device 1 generates data to be transmitted to each of sink devices 2-4, 2-3, 2-2 and 2-1 which are provided in a tiling manner (step S1202). The present embodiment shows an example of a case where one frame data (image data) item is divided such that tiling display is applied to four sink devices 2.

FIG. 13 is a diagram showing an example of the data of an image transmitted by the source device and the data of an image displayed by each sink device in a tile view according to the second embodiment. FIG. 13(*a*) is an example in which the source device 1 divides star frame data into four tile data items TD12, TD22, TD32 and TD42 in step S1202. FIG. 13(*b*) is an example in which the display units 204 of four sink devices 2 are caused to display the star image of FIG. 13(*a*).

In step S1201, from the obtained tiling information, the source device 1 recognizes that the tiling pattern is TP1, and the tiling locations of sink devices 2-1, 2-2, 2-3 and 2-4 are T1, T2, T3 and T4, respectively. Further, the source device 1 recognizes the connection order of sink devices 2-1, 2-2, 2-3 and 2-4 from the daisy chain stage number obtained in step S1201. Thus, in step S1201, the source device 1 recognizes the tiling locations and connection order of four sink devices 2. By this configuration, the source device 1 associates four tile data items TD12, TD22, TD32 and TD42 with daisy chain stage numbers (step S1203). FIG. 13(*c*) is an example in which a tile data item is associated with each sink device 2 when display should be applied as shown in FIG. 13(*b*). Tile data items TD12, TD22, TD32 and TD42 prepared by dividing data are associated with sink devices 2-1, 2-2, 2-3 and 2-4, respectively.

Returning to FIG. 11, in a manner similar to that of the first embodiment, the source device 1 generates a multistream signal as shown in FIG. 4(*a*) by inserting a stream number which is a daisy chain stage number and the associated tile data item into an FRL packet for each stream (step S1204). The source device 1 transmits the generated multistream signal (step S1205).

For example, each sink device 2 receives an FRL packet and causes the display unit 204 to display data in accordance with the flowchart of FIG. 9. In this manner, one frame data item can be displayed in a tile view as shown in FIG. 13(*b*).

By the above procedure, the source device 1 can transmit a multistream signal to the daisy-chained sink devices 2 and cause one frame data item to be displayed in a tile view by using the tiling information of the sink devices 2.

Third Embodiment

In the present embodiment, a source device transmits a test pattern to each sink device. In an example of the present embodiment, the source device reads the image displayed by each sink device with a camera, etc., and estimates the tiling pattern and tiling location of each sink device. The source device sets the estimated tiling pattern and tiling location in each sink device.

Figure 14:
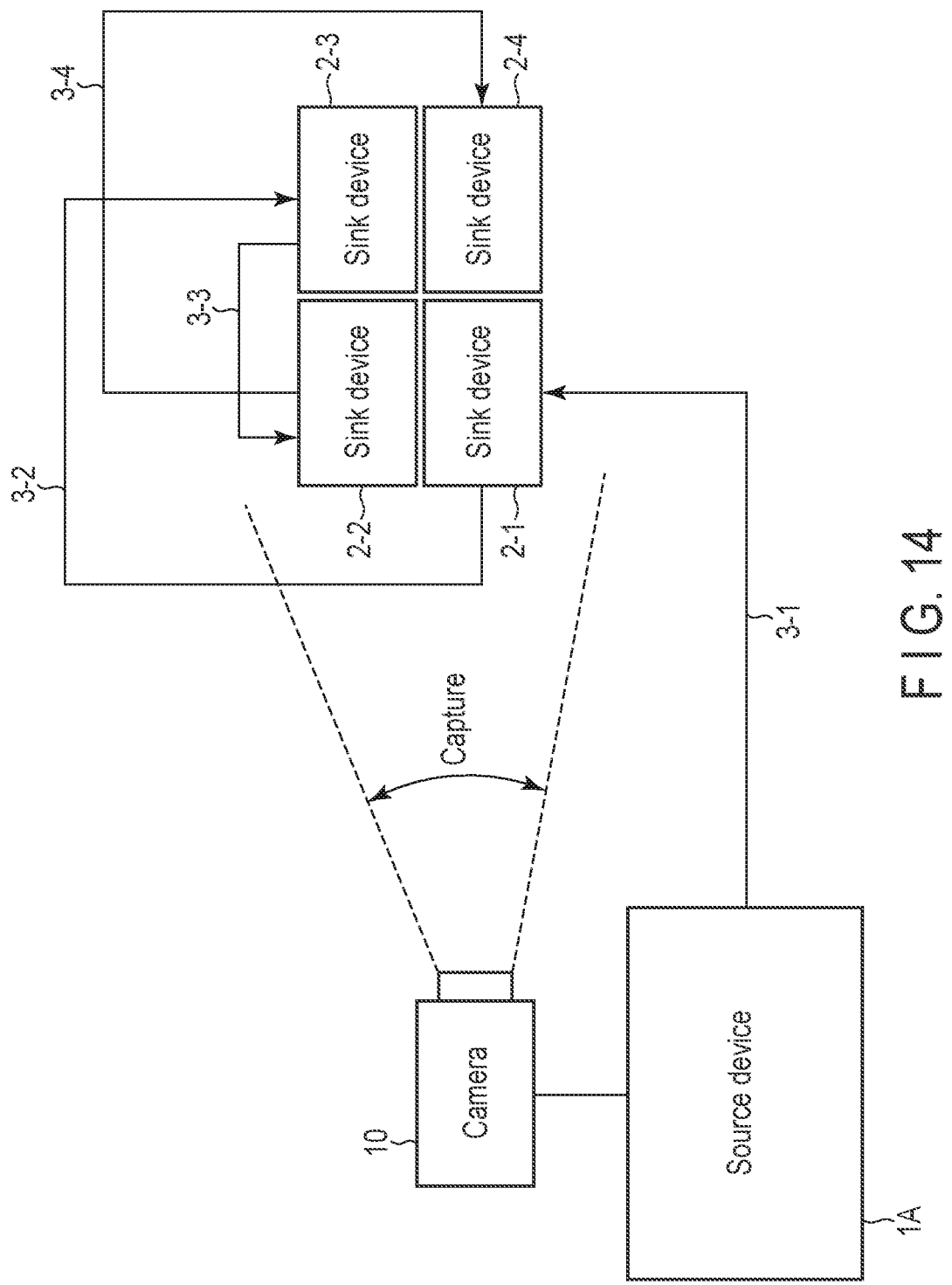
FIG. 14 is a conceptual diagram of an HDMI multistream signal transmission system according to a third embodiment.

FIG. 14 is a conceptual diagram of an HDMI multistream signal transmission system according to a third embodiment.

The system of the present embodiment comprises a source device 1A, sink devices 2 (the same as FIG. 3) and an HDMI cable 3 (the same as FIG. 3). In the present embodiment, sink devices 2 are daisy-chained in the connection order of sink devices 2-1, 2-3, 2-2 and 2-4. Thus, the connection orders of sink devices 2-3 and 2-2 are swapped compared to the case of the second embodiment.

Figure 15:
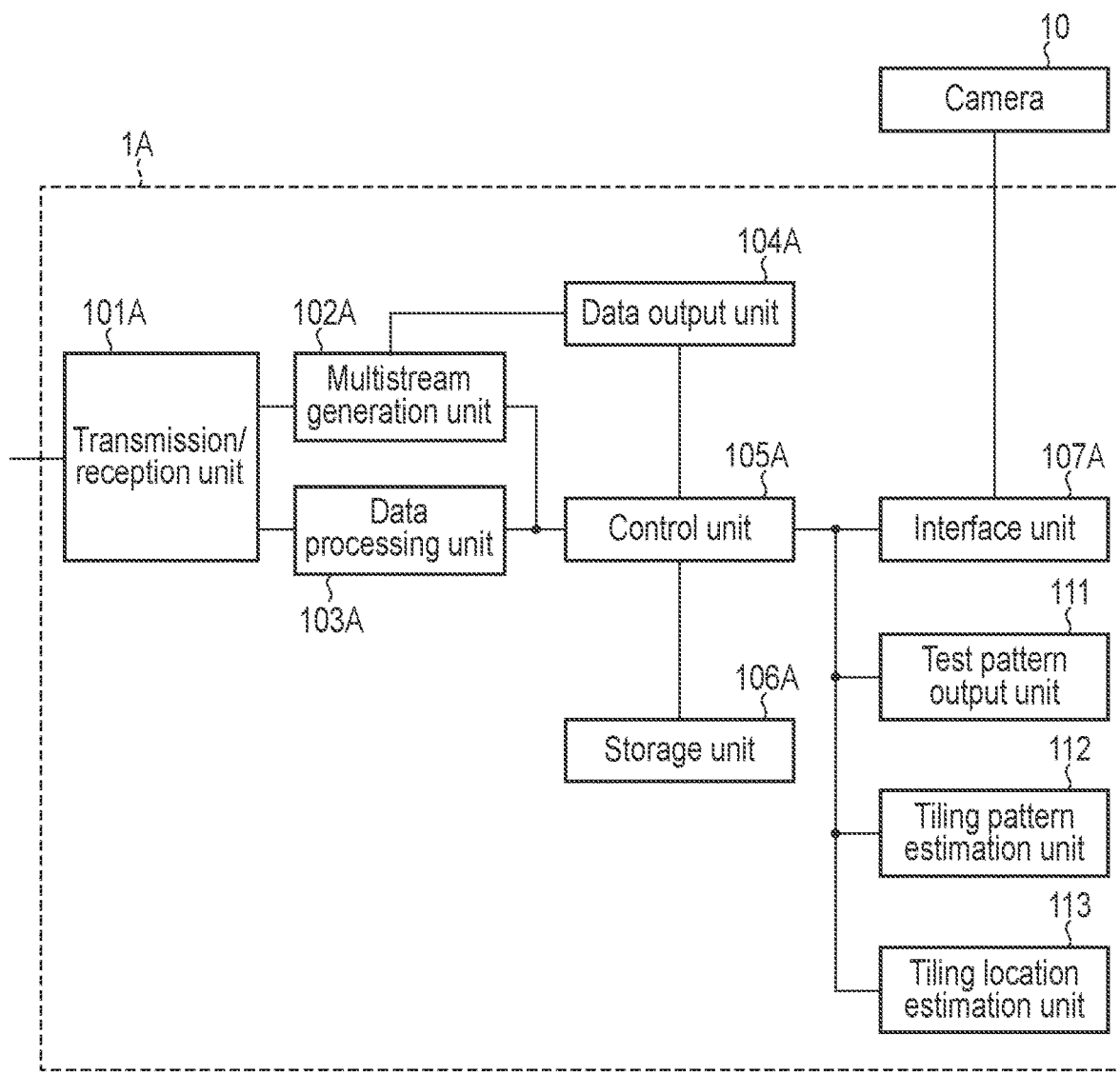
FIG. 15 is a block diagram showing a configuration example of a source device according to the third embodiment.

FIG. 15 is a block diagram showing a configuration example of the source device according to the third embodiment.

In the source device 1A, the functional blocks having the same terms as the source device 1 of FIG. 2 basically have the same functions. Thus, with regard to the functional blocks which are not particularly different from those of FIG. 2, only the reference numbers are changed, detailed descriptions thereof being omitted.

A camera 10 can obtain an image and a moving image. For example, the camera 10 may be connectable to an interface unit 107A and captures and obtains an image based on a trigger from a control unit 105A, etc., and transmits the obtained image data to the control unit 105A. The camera 10 may be included in the source device 1A or may not be included in the source device 1A.

A test pattern output unit 111 outputs the test pattern data of the frame data to be displayed in a plurality of sink devices 2 to a multistream generation unit 102A, etc., to obtain the tiling information of the sink devices 2.

A tiling pattern estimation unit 112 applies image recognition to the data of the image captured by the camera 10, recognizes the overall provision pattern of the sink devices 2 and determines (or estimates) the tiling pattern.

A tiling location estimation unit 113 applies image recognition to the data of the image captured by the camera 10, recognizes the tiling location of each sink device 2 and determines (or estimates) the tiling location.

Figure 16:
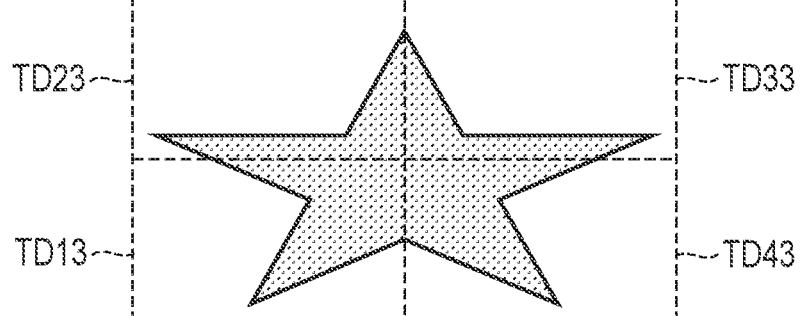
FIG. 16 is a diagram showing an example of a test pattern transmitted by the source device and the obtained image data according to the third embodiment.
Figure 16:
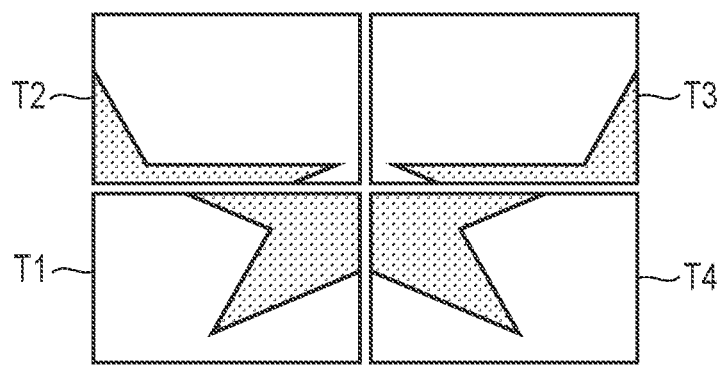

FIG. 16 is a diagram showing an example of the data of the image transmitted by the source device and the data of the image displayed by each sink device according to the third embodiment.

FIG. 16(a) is an example in which star frame data which is an output example of the test pattern output unit 111 is shown. In the example, to cause four sink devices 2 to display the star frame data, the star frame data is divided into tile data items TD13, TD23, TD33 and TD43. FIG. 16(b) shows an example of the data of an image captured by the camera 10. FIG. 16(c) is an example in which tile data items are associated with daisy chain stage numbers (equivalent to the identification numbers of the sink devices).

Hereinafter, this specification explains a process in the present embodiment.

For example, when a user provides the system with the configuration of FIG. 14 and turns on all devices such that they are electrically connected to the source device 1A, the source device 1A obtains the sink device information of the sink devices 2 in accordance with the sequence chart of FIG. 6, etc. The sink device information includes basic data such as a daisy chain stage number and an image output capability. At this time, tiling information is not set in the sink devices 2. The source device 1A does not have tiling information either. For example, the user transmits a tiling information acquisition command from a remote control, etc.

Figure 17:
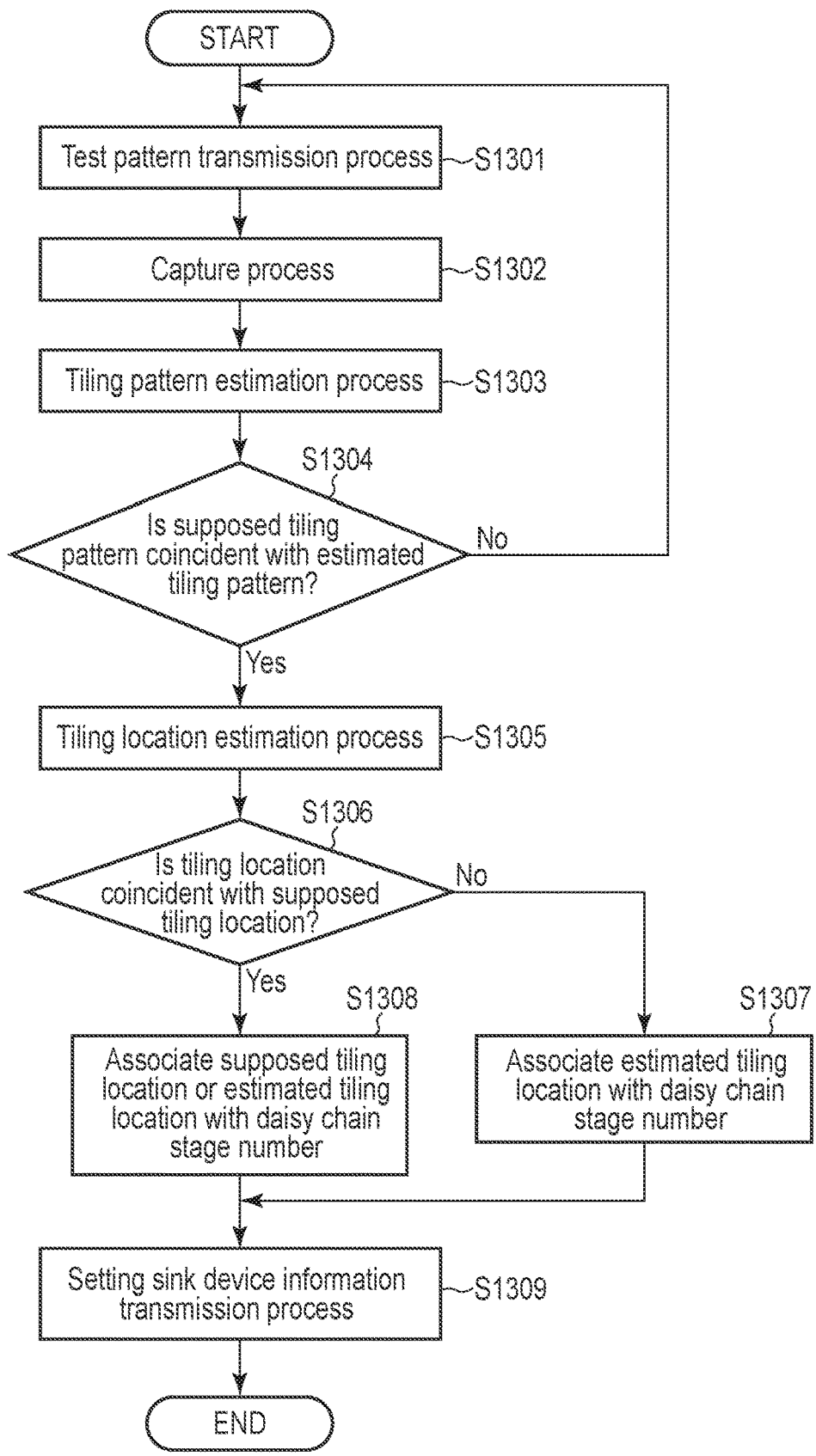
FIG. 17 is a flowchart showing a processing operation example in which the source device generates sink device information according to the third embodiment.

FIG. 17 is a flowchart showing a processing operation example for enabling the source device to generate sink device information according to the third embodiment.

The source device 1A transmits test pattern data by a multistream signal (step S1301). Step S1301 is hereinafter more specifically explained.

The control unit 105A outputs the tiling information acquisition command received from the remote control to the test pattern output unit 111. The test pattern output unit 111 outputs test pattern data. The test pattern data may be stored in the storage unit (not shown) of the test pattern output unit 111 in advance or may be input to the test pattern output unit 111 from an external personal computer, etc., via the interface unit 107A.

The test pattern data is, for example, output to a data output unit 104A via the control unit 105A and input from the data output unit 104A to the multistream generation unit 102A. The multistream generation unit 102A generates a multistream signal as shown in FIG. 4(a) by inserting the test pattern data into the multistream signal. The multistream generation unit 102A also inserts the data shown in FIG. 16(c) into the multistream signal. This specification hereinafter more specifically explains the generation of a multistream signal by the source device 1A.

Figure 18:
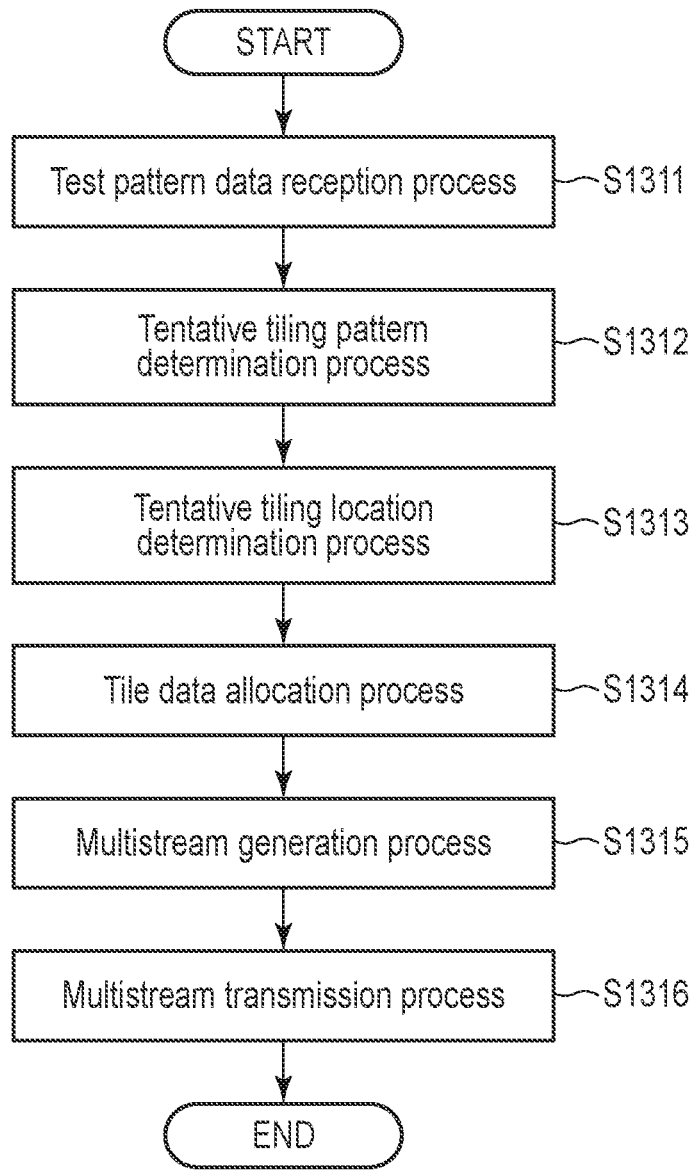
FIG. 18 is a flowchart showing a processing operation example in which the source device transmits test pattern data by a multistream signal according to the third embodiment.

FIG. 18 is a flowchart showing a processing operation example in which the source device transmits test pattern data by a multistream signal according to the third embodiment, and is equivalent to a detailed process in step S1301 of FIG. 17.

When the multistream generation unit 102A receives test pattern data (step S1311), the multistream generation unit 102A tentatively determines the tiling pattern of the sink devices 2 (step S1312). When the multistream generation unit 102A tentatively determines the tiling pattern as FIG. 10(b) in step S1312, the multistream generation unit 102A tentatively determines the tiling location relative to each daisy chain stage number (step S1313). The tiling location tentatively determined in step S1313 is referred to as a supposed tiling location. Here, as shown in FIG. 16(c), it is assumed that 3, 2, 1 and 0 of the daisy chain stage number D31 correspond to T1, T2, T3 and T4 of the supposed tiling location D32, respectively. At this time, it is unknown regarding which sink device 2 is provided in T1, T2, T3 or T4.

The multistream generation unit 102A allocates TD13, TD23, TD33 and TD43 of the four tile data items D33 prepared by dividing the frame of the test pattern to 3, 2, 1 and 0 of the daisy chain stage number D31, respectively (step S1314). When the supposed tiling location D32 is determined, in association with this determination, the tile data items D33 are assumed to be determined.

For example, relative to 3 of the daisy chain stage number D31 in FIG. 16(c), the supposed tiling location is set as T1, and TD13 is allocated to the tile data item. Relative to 2 of the daisy chain stage number D31, the supposed tiling location is set as T2, and TD23 is allocated to the tile data item.

Returning to FIG. 18, the multistream generation unit 102A inserts the daisy chain stage number D31 and the tile data item D33 of FIG. 16(c) into an FRL packet and generates the multistream signal of FIG. 4(a) (step S1315). More specifically, the multistream generation unit 102A stores a daisy chain stage number as a stream number in the header area as shown in FIG. 4(d) and stores a tile data item associated with the daisy chain stage number in the data area as shown in FIG. 4(b) to generate an FRL packet. The multistream generation unit 102A outputs the generated multistream signal (step S1316). The multistream signal is output from a transmission/reception unit 101A to HDMI cable 3-1.

Returning to FIG. 17, when the source device 1A outputs the multistream signal including the test pattern data, the source device 1A captures an image of each sink device 2 by the camera 10 (step S1302). FIG. 16(b) is an example of capture image data in step S1302. The tiling pattern estimation unit 112 applies image recognition to capture image data and estimates the tiling pattern (step S1303).

When the tiling pattern estimated in step S1303 (referred to as an estimated tiling pattern) is different from the tiling pattern supposed in step S1312 (No in step S1304), the process may return to step S1301. The estimated tiling pattern may be replaced by the supposed tiling pattern. The test pattern may be transmitted again. When the recognized tiling pattern is coincident with the tiling pattern supposed in step S1312 (Yes in step S1304), the tiling location estimation unit 113 determines that the supposed tiling pattern is the current actual tiling pattern, and estimates the tiling location in the supposed tiling pattern (step S1305).

The control unit 105A compares the tiling location estimated in step S1305 (referred to as an estimated tiling location) with the supposed tiling location transmitted in step S1301 (step S1306). When the estimated tiling location is different from the supposed tiling location, the control unit 105A associates the estimated tiling location with the daisy chain stage number (No in step S1306 and step S1307). More specifically, the control unit 105A compares FIG. 16(a) equivalent to the supposed tiling location with FIG. 16(b) equivalent to the estimated tiling location and recognizes that the displays of T2 and T3 of FIG. 16(b) are swapped. The control unit 105A determines that the association between the daisy chain stage number and the supposed tiling location in the test pattern transmitted in step S1301 is incorrect. The control unit 105A determines the estimated tiling location as a correct tiling location.

When the estimated tiling location is coincident with the supposed tiling location (Yes in step S1306), the control unit 105A associates the estimated tiling location or the supposed tiling location with the daisy chain stage number (step S1308).

The source device 1A inserts the daisy chain stage number D31 and the tiling location associated in step S1307 or S1308 into setting sink device information and transmits the data to each sink device 2 (step S1309).

In step S1309, the source device 1A transmits the setting sink device information by using, for example, the DDC line of the HDMI cable 3, and updates the setting information of the sink devices 2. The DDC line is a transmission path in the HDMI cable 3 defined in HDMI 2.1. In each sink device 2, sink device information such as the EEDID of the self-device is updated with the data received by the DDC line.

FIG. 19 is a flowchart showing a processing operation example in which a sink device receives and stores sink device information according to the third embodiment.

When each sink device 2 receives setting sink device information from the source device 1A (step S2301), the sink device 2 confirms the daisy chain stage number included in the setting sink device information (step S2302). For example, when information which is coincident with the daisy chain stage number of the self-device stored in a storage unit 206 is present (Yes in step S2303), a control unit 205 obtains setting sink device information (step S2304) and updates sink device information such as the EEDID of the self-device (step S2305).

In step S2305, the sink device 2 updates the applicable area of the nearest sink device 2 regarding the set tiling pattern and tiling location. The nearest sink device 2 monitors the DDC address having access. When the area is an area read from the downstream side, the EEDID of the nearest downstream sink device 2 is updated by using the DDC line.

By the above procedure, the source device 1A can estimate the tiling pattern and tiling locations of a plurality of sink devices 2 which are connected by daisy-chaining and set the estimated tiling pattern and tiling location in the applicable sink device 2.

In the present embodiment, the tiling information acquisition command output from the remote control, etc., by the user is the trigger of the transmission of the test pattern by the source device 1A. However, the trigger may be arbitrarily determined.

Modification Example 1

This modification example is a modification example of the third embodiment. In this modification example, when the provision pattern of sink devices is set as FIG. 10(d), tiling information is estimated using a test pattern.

In this modification example, the source device 1A generates a daisy chain stage number, a tiling pattern and a tiling location (allocation information) of each sink device 2 and sets it in each sink device. In a manner similar to that of the third embodiment, the source device 1A generates allocation information by transmitting test pattern data from the source device 1A, causing each sink device to display the data, capturing an image of the sink devices and applying automatic recognition. The source device 1A which read the display capabilities and tiling information of the sink devices 2 can cause the sink devices 2 to appropriately perform tiling display by referring to the information, generating a multistream signal and transmitting it to the sink devices 2. This operation is hereinafter more specifically explained with reference to drawings. The processing procedure in this modification example is the same as FIG. 17 and FIG. 18.

FIG. 20 is a diagram showing an example of a test pattern transmitted by the source device and tiling display in a tiling pattern according to modification example 1.

Four sink devices 2 (the same as FIG. 3) are connected by daisy-chaining in the order of 2-1, 2-3, 2-4 and 2-2 as shown in FIG. 20(a). In a manner similar to that of the operation of the third embodiment, the source device 1A (the same as FIG. 15) allocates the supposed tiling location D42 and the tile data item D43 to the obtained daisy chain stage number D41 as shown in FIG. 20(b). FIG. 20(c) is a display example of a case where the tile data item D43 is allocated to the supposed tiling location D42. The source device 1A transmits a test pattern by a multistream signal in accordance with this allocation.

FIG. 20(d) is an example of the data of an image captured by the camera 10 of the source device 1A. Since four sink devices 2 are connected by daisy-chaining in the order of 2-1, 2-3, 2-4 and 2-2, in a manner different from that of FIG. 20(c), the sink devices perform tiling display as shown in FIG. 20(d).

The tiling pattern estimation unit 112 estimates that the tiling pattern is FIG. 10(d) by image recognition relative to the image data of FIG. 20(d). The tiling location estimation unit 113 recognizes the figure displayed in each tile by image recognition and recognizes them as the image recognition result D44 of FIG. 20(d). The tiling location estimation unit 113 associates the estimated tiling location D45 with the daisy chain stage number D41, and at the same time, associates the tile data item in the order of the figures of the image recognition result D44 as shown in FIG. 20(*d*).

When the supposed tiling location is different from the estimated tiling location, the source device 1A may allocate the estimated tiling location D45 and the tile data item D44 to the daisy chain stage number D41 by regarding the image recognition result D44 as the tile data item and output a similar test pattern again. In this case, four sink devices 2 perform tiling display as shown in FIG. 20(*c*).

The source device 1A uses the recognized tiling pattern and the tiling location (the estimated tiling location D45) associated with the daisy chain stage number D41 as setting sink device information, transmits the setting sink device information to each sink device 2 by the DDC line based on the flow of FIG. 19, etc., and updates the sink device information of each sink device 2. In each sink device 2, the sink device information associated with the daisy chain stage number of the self-device is stored in the storage unit 206 of the self-device.

By the above procedure, when the tiling pattern of a plurality of sink devices 2 is FIG. 10(*d*), the source device 1A can estimate the tiling pattern and the tiling location of each sink device 2 and set the estimated tiling pattern and tiling location in the applicable sink device 2.

Modification Example 2

This modification example shows a modification example of the acquisition procedure of sink device information shown in FIG. 6 of the first embodiment. In FIG. 6, the trigger for reading sink device information is turning on by sink device 2-4 (step SC11). In this modification example, another sink device 2 or the source device 1 is set as the trigger. The system configuration of this modification example is the same as the first embodiment.

Figure 21:
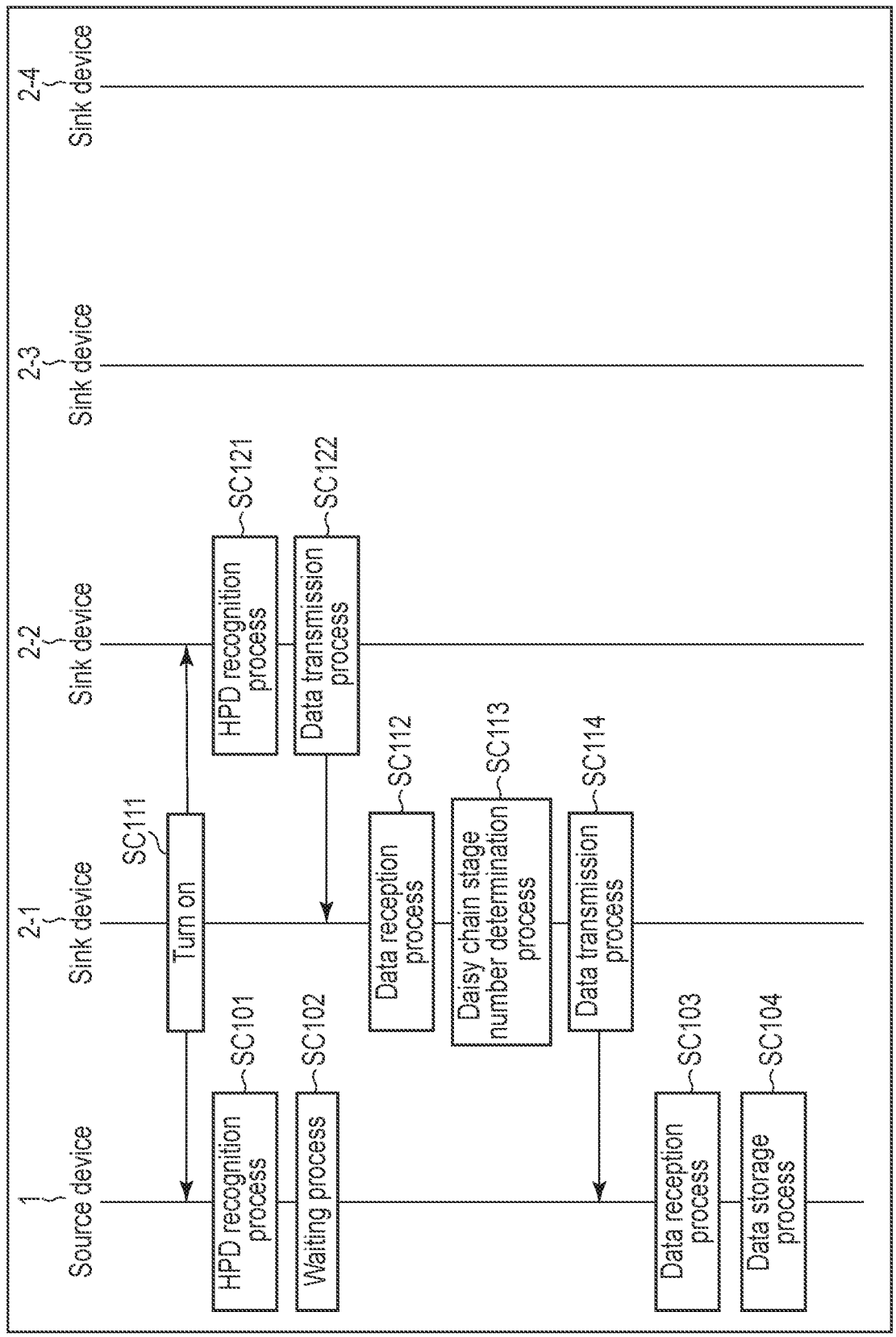
FIG. 21 is a sequence chart showing an example of a process when the trigger for reading sink device information is set as sink device 2-1 in modification example 2.

FIG. 21 is a sequence chart showing an example of a process when the trigger for reading sink device information is set as sink device 2-1 in modification example 2.

Sink device 2-1 is assumed to be turned on. Thus, it is assumed that electrical connection is performed for sink device 2-2 (step SC111). As HPD is turned on, the source device 1 and sink device 2-2 recognize the electrical connection of sink device 2-1 (steps SC101 and SC121). The source device 1 waits for a response from sink device 2-1 after step SC101 (step SC102). After step SC121, sink device 2-2 transmits the sink device information stored in the storage unit of the self-device to sink device 2-1 (step SC122). The sink device information in step SC122 includes the information of the downstream sink devices 2 (sink device 2-3 and sink device 2-4) in addition to the information of sink device 2-2. Sink device 2-1 receives sink device information from sink device 2-2 (step SC112). Since the steps subsequent to step SC112 are the same as the steps subsequent to step SC41 of FIG. 6, detailed description thereof is omitted.

By the above procedure, the source device 1 can read the sink device information of all sink devices by using the turning on of sink device 2-1 as the trigger.

Figure 22:
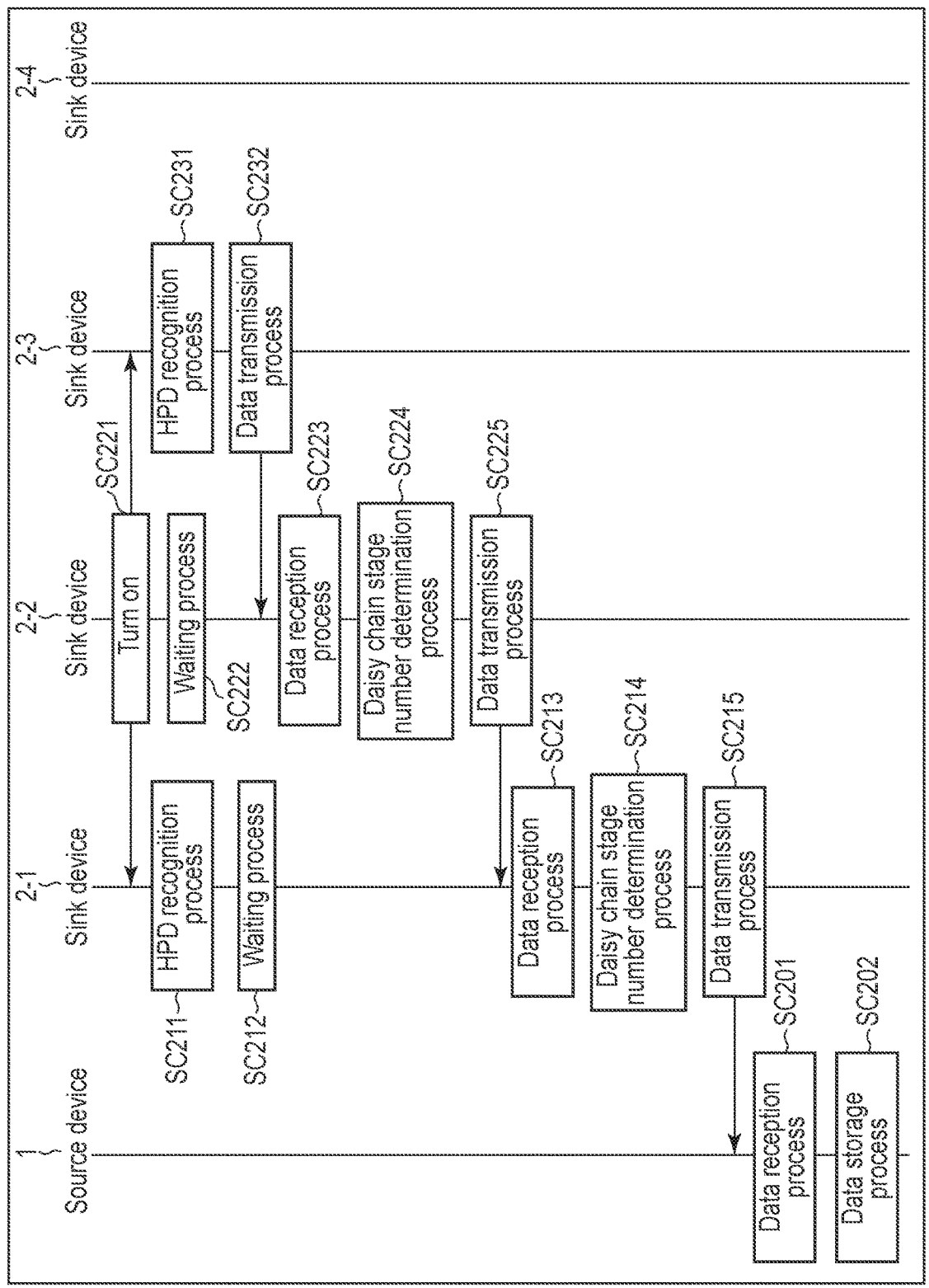
FIG. 22 is a sequence chart showing an example of a process when the trigger for reading sink device information is set as sink device 2-2 in modification example 2.

FIG. 22 is a sequence chart showing an example of a process when the trigger for reading sink device information is set as sink device 2-2 in modification example 2.

Sink device 2-2 is assumed to be turned on. Thus, it is assumed that electrical connection is performed for sink device 2-1 and sink device 2-3 (step SC221). As HPD is turned on, sink device 2-1 and sink device 2-3 recognize the electrical connection of sink device 2-2 (steps SC211 and SC231). After step SC211, sink device 2-1 waits for a response from sink device 2-2 (step SC212). After step SC231, sink device 2-3 transmits the sink device information stored in the storage unit of the self-device to sink device 2-2 (step SC232). The sink device information in step SC232 includes the information of the downstream sink device 2-4 in addition to the information of sink device 2-3.

When sink device 2-2 receives sink device information from sink device 2-3 (step SC223), sink device 2-2 confirms the daisy chain stage number of the nearest downstream sink device 2-3 from the received sink device information, adds one to the daisy chain stage number of sink device 2-3 and sets the obtained value as the daisy chain stage number of the self-device (step SC224). Sink device 2-2 stores, in the storage unit 206, the sink device information received in step SC223 and the daisy chain stage number of the self-device, and transmits EEDID as sink device information (step SC225).

When sink device 2-1 receives sink device information from sink device 2-2 (step SC213), sink device 2-1 confirms the daisy chain stage number of the nearest downstream sink device 2-2 from the received sink device information, adds one to the daisy chain stage number of sink device 2-2 and sets the obtained value as the daisy chain stage number of the self-device (step SC214). Sink device 2-1 stores, in the storage unit 206D, the sink device information received in step SC213 and the daisy chain stage number of the self-device, and transmits EEDID as sink device information (step SC215).

The source device 1 receives sink device information from sink device 2-1 (step SC201) and stores the received sink device information in a storage unit 106 (step SC202). By the above procedure, the source device 1 can read the sink device information of all sink devices by using the turning on of sink device 2-1 as the trigger.

Figure 23:
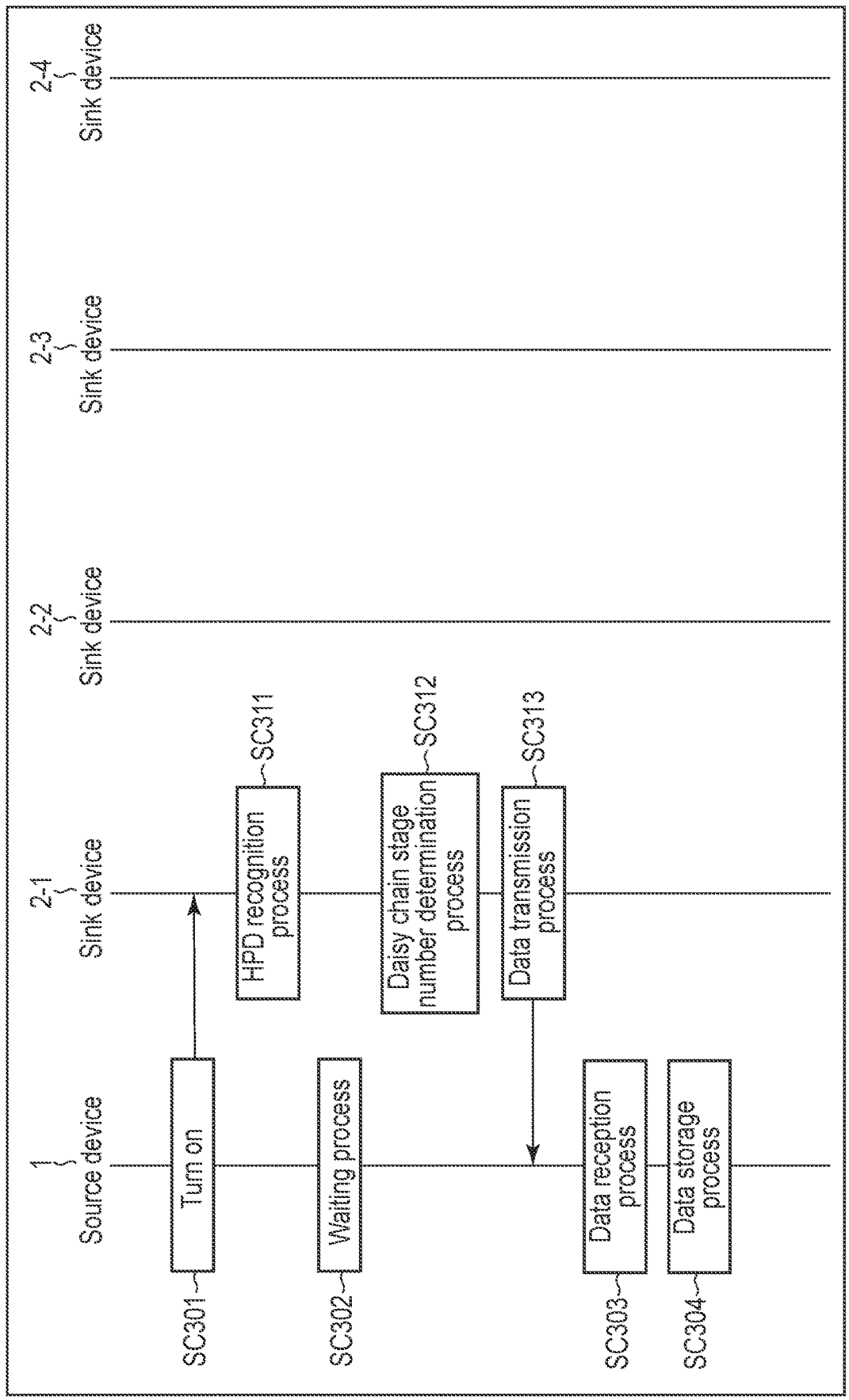
FIG. 23 is a sequence chart showing an example of a process when the trigger for reading sink device information is set as the source device in modification example 2.

FIG. 23 is a sequence chart showing an example of a process when the trigger for reading sink device information is set as the source device in modification example 2.

The source device 1 is assumed to be turned on. Thus, it is assumed that electrical connection is performed for sink device 2-1 (step SC301). As HPD is turned on, sink device 2-1 recognizes the electrical connection of the source device 1 (step SC311). The source device 1 waits for a response from sink device 2-1 after step SC301 (step SC302). After step SC311, sink device 2-1 transmits the sink device information stored in the storage unit of the self-device to the source device 1 (step SC313). The sink device information in step SC313 includes the information of the downstream sink devices 2-2, 2-3 and 2-4 in addition to the information of sink device 2-1.

The source device 1 receives sink device information from sink device 2-1 (step SC303) and stores the received sink device information in the storage unit 106 (step SC304). By the above procedure, the source device 1 can read the sink device information of all sink devices by using the turning on of the source device 1 itself as the trigger.

In this modification example, similarly, when the source device 1 or an arbitrary sink device 2 is turned on and connected, the source device 1 can obtain sink device information such as the daisy chain stage numbers of all sink devices 2. In addition to the daisy chain stage numbers, as shown in FIG. 12, the source device 1 can obtain tiling information from all sink devices 2 in the same manner.

In the above embodiments and modification examples, the number of stream signals of the multistream signal and the number of sink devices 2 are four. However, the numbers are not limited to four.

The features of the sink devices and source device of the above embodiments and modification examples are also shown as follows.

(A-1) Sink device corresponding to multistream transmission (A-2) Sink device comprising the capability to extract an arbitrary video signal from a multistream signal and display the video signal (A-3) Sink device comprising the capability to transmit a multistream signal to a downstream sink device (A-4) Sink device comprising the capability to read the display capability of a downstream sink device and inform the upstream side of the display capability (A-5) Sink device comprising the capability to inform the upstream side of its display capability (A-6) Sink device comprising the capability to set tiling information (A-7) Sink device comprising the capability to inform an upstream sink of the above tiling information (A-8) Sink device comprising the capability to read tiling information from a downstream sink device and inform the upstream side of the tiling information (B-1) Source device comprising the capability to multiplex a plurality of video signals and generate and transmit a multistream signal (B-2) Source device comprising the capability to adjust the above multistream based on the read display capability of a sink device (B-3) Source device comprising a source device which comprises the following capability and corresponds to multistream transmission (B-4) Source device comprising the capability to read tiling information from a sink device (B-5) Source device comprising the capability to adjust the allocation of a video signal in a multistream signal based on tiling information (B-6) Source device comprising the capability to generate a test pattern signal which can specify tiling allocation information based on a plurality of sink device capabilities read from a sink device (B-7) Source device comprising the capability to recognize tiling information from an image in which the above test pattern signal is displayed in a sink device According to at least one of the above embodiments and modification examples, it is possible to provide a transmission method and a program of a multistream signal to be displayed in a plurality of daisy-chained sink devices.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The technical elements in each embodiment can be applied to another embodiment. The accompanying claims and their equivalents are intended to cover such forms or modifications as would fall within the scope and spirit of the inventions. Furthermore, the constituent elements in claims are in the category of the embodiments even if the components are expressed separately, even if the components are expressed in association with each other or even if the components are expressed in combination with each other. A plurality of embodiments may be combined with each other. The embodiments structured by these combinations also fall within the scope of the inventions. Some of the constituent elements disclosed in the embodiments may be deleted. Furthermore, the constituent elements described in different embodiments may be arbitrarily combined.

In addition, in some cases, in order to make the description clearer, the widths, thicknesses, shapes, etc., of the respective parts are illustrated schematically in the drawings, rather than as an accurate representation of what is implemented. In block diagrams, data and signals may be transferred between blocks which are not connected by a line or in a direction which is connected by a line and is not indicated by an arrow. The processes shown in flowcharts and sequence charts may be realized by hardware such as an IC chip or a digital signal processor (DSP), software (a program, etc.) caused to operate by a computer including a microcomputer or a combination of hardware and software. When a claim is expressed as a control logic, or a claim is expressed as a program including an instruction for executing a computer, or a claim is expressed as a computer-readable recording medium describing the instruction, the device of the embodiments described herein is applied. The embodiments are not limited to the terms and expressions used in this specification. When the same contents and concepts are referred to by other expressions, the matters shown by these expressions are also included in the scope of the inventions.

What is claimed is:

1. A source device that generates a multistream signal including content streams transmitted to a plurality of sink devices that are connected by daisy-chaining, wherein
    the source device is configured to generate the multistream signal by associating daisy chain stage numbers of the sink devices with the content streams for the sink devices based on a tiling pattern and a tiling location of each of the sink devices, the generated multistream signal including the daisy chain stage numbers and the content streams,
    wherein the source device is further configured to
        obtain the tiling pattern and the tiling locations from the sink devices,
        estimate the tiling pattern and the tiling locations of the sink devices,
        associate, as first content streams, a plurality of tile data items that are obtained by dividing a test pattern, which is a first display content, with the daisy chain stage numbers of the sink devices, respectively, and generate and transmit a first multistream signal including the first content streams and the daisy chain stage numbers associated with the first content streams, and
        compare a second display content, which is displayed by the sink devices based on the received first multistream signal, with the test pattern to estimate the tiling pattern and the tiling locations of the sink devices.

2. The source device of claim 1, wherein the source device is further configured to obtain the daisy chain stage numbers from the sink devices.

3. The source device of claim 1, wherein the source device is further configured to estimate the tiling pattern and the tiling locations based on a captured image of the sink devices that are connected by daisy-chaining.

4. The source device of claim 1, wherein the source device is further configured to associate the estimated tiling pattern and tiling locations for the sink devices with corresponding daisy chain stage numbers, generate setting sink device information including the estimated tiling pattern and tiling locations and the daisy chain stage numbers, and transmit the setting sink device information to the sink devices.

* * * * *